US008798991B2

(12) United States Patent
Washio et al.

(10) Patent No.: US 8,798,991 B2
(45) Date of Patent: Aug. 5, 2014

(54) NON-SPEECH SECTION DETECTING METHOD AND NON-SPEECH SECTION DETECTING DEVICE

(71) Applicant: Fujitsu Limited, Kanagawa (JP)

(72) Inventors: Nobuyuki Washio, Kawasaki (JP); Shoji Hayakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/675,317

(22) Filed: Nov. 13, 2012

(65) Prior Publication Data

US 2013/0073281 A1 Mar. 21, 2013

Related U.S. Application Data

(60) Division of application No. 12/754,156, filed on Apr. 5, 2010, now Pat. No. 8,326,612, which is a continuation of application No. PCT/JP2007/074274, filed on Dec. 18, 2007.

(51) Int. Cl.

| | |
|---|---|
| *G10L 21/00* | (2013.01) |
| *G10L 25/93* | (2013.01) |
| *G10L 15/00* | (2013.01) |
| *G10L 17/00* | (2013.01) |

(52) U.S. Cl.
USPC ............................ 704/208; 704/210; 704/248

(58) Field of Classification Search
USPC .......................................... 704/208, 210, 248
See application file for complete search history.

(56) References Cited

U.S. PATENT DOCUMENTS

| | | | | |
|---|---|---|---|---|
| 4,008,375 A * | 2/1977 | Lanier | 704/250 |
| 4,074,069 A * | 2/1978 | Tokura et al. | 704/208 |
| 4,359,604 A * | 11/1982 | Dumont | 704/233 |
| 4,375,083 A * | 2/1983 | Maxemchuk | 704/278 |
| 4,624,008 A * | 11/1986 | Vensko et al. | 704/253 |
| 4,696,039 A * | 9/1987 | Doddington | 704/215 |
| 4,771,465 A * | 9/1988 | Bronson et al. | 704/207 |
| 4,797,929 A * | 1/1989 | Gerson et al. | 704/243 |
| 4,802,221 A * | 1/1989 | Jibbe | 704/208 |
| 4,879,748 A * | 11/1989 | Picone et al. | 704/208 |
| 5,195,166 A * | 3/1993 | Hardwick et al. | 704/200 |
| 5,216,747 A * | 6/1993 | Hardwick et al. | 704/208 |

(Continued)

FOREIGN PATENT DOCUMENTS

| | | |
|---|---|---|
| EP | 1 160 763 A2 | 12/2001 |
| JP | 63-291096 | 11/1988 |

(Continued)

*Primary Examiner* — Eric Yen
(74) *Attorney, Agent, or Firm* — Greer Burns & Crain Ltd.

(57) ABSTRACT

A non-speech section detecting device generating a plurality of frames having a given time length on the basis of sound data obtained by sampling sound, and detecting a non-speech section having a frame not containing voice data based on speech uttered by a person, the device including: a calculating part calculating a bias of a spectrum obtained by converting sound data of each frame into components on a frequency axis; a judging part judging whether the bias is greater than or equal to a given threshold or alternatively smaller than or equal to a given threshold; a counting part counting the number of consecutive frames judged as having a bias greater than or equal to the threshold or alternatively smaller than or equal to the threshold; a count judging part judging whether the obtained number of consecutive frames is greater than or equal to a given value.

5 Claims, 22 Drawing Sheets

(56) References Cited

U.S. PATENT DOCUMENTS

| | | | | | |
|---|---|---|---|---|---|
| 5,365,592 | A * | 11/1994 | Horner et al. | 704/250 |
| 5,414,796 | A | 5/1995 | Jacobs et al. | |
| 5,450,484 | A * | 9/1995 | Hamilton | 379/351 |
| 5,473,727 | A * | 12/1995 | Nishiguchi et al. | 704/222 |
| 5,515,432 | A | 5/1996 | Rasmusson | |
| 5,548,680 | A * | 8/1996 | Cellario | 704/219 |
| 5,590,242 | A | 12/1996 | Juang et al. | |
| 5,617,508 | A | 4/1997 | Reaves | |
| 5,664,059 | A | 9/1997 | Zhao | |
| 5,682,463 | A * | 10/1997 | Allen et al. | 704/230 |
| 5,765,124 | A | 6/1998 | Rose et al. | |
| 5,778,338 | A | 7/1998 | Jacobs et al. | |
| 5,794,192 | A | 8/1998 | Zhao | |
| 5,937,375 | A | 8/1999 | Nakamura | |
| 6,006,175 | A * | 12/1999 | Holzrichter | 704/208 |
| 6,014,620 | A | 1/2000 | Handel | |
| 6,073,092 | A | 6/2000 | Kwon | |
| 6,246,978 | B1 * | 6/2001 | Hardy | 704/201 |
| 6,427,134 | B1 * | 7/2002 | Garner et al. | 704/233 |
| 6,456,697 | B1 | 9/2002 | Chang et al. | |
| 6,475,245 | B2 * | 11/2002 | Gersho et al. | 704/208 |
| 6,556,967 | B1 * | 4/2003 | Nelson et al. | 704/233 |
| 6,587,816 | B1 * | 7/2003 | Chazan et al. | 704/207 |
| 6,694,293 | B2 * | 2/2004 | Benyassine et al. | 704/229 |
| 6,704,702 | B2 * | 3/2004 | Oshikiri et al. | 704/207 |
| 6,757,301 | B1 * | 6/2004 | Tsai | 370/493 |
| 6,865,529 | B2 * | 3/2005 | Brandel et al. | 704/207 |
| 6,959,274 | B1 * | 10/2005 | Gao et al. | 704/219 |
| 7,062,433 | B2 | 6/2006 | Gong | |
| 7,106,839 | B2 | 9/2006 | Davis | |
| 7,191,122 | B1 * | 3/2007 | Gao et al. | 704/223 |
| 7,440,891 | B1 * | 10/2008 | Shozakai et al. | 704/233 |
| 7,613,606 | B2 * | 11/2009 | Makinen | 704/221 |
| 7,643,993 | B2 * | 1/2010 | Heiman | 704/242 |
| 7,680,651 | B2 * | 3/2010 | Tammi et al. | 704/219 |
| 8,015,000 | B2 * | 9/2011 | Zopf et al. | 704/208 |
| 8,019,615 | B2 * | 9/2011 | Heiman et al. | 704/503 |
| 8,275,611 | B2 * | 9/2012 | Zong et al. | 704/225 |
| 2002/0007270 | A1 | 1/2002 | Murashima | |
| 2003/0093265 | A1 * | 5/2003 | Xu et al. | 704/208 |
| 2003/0115055 | A1 | 6/2003 | Gong | |
| 2003/0125935 | A1 * | 7/2003 | Zinser et al. | 704/207 |
| 2006/0262851 | A1 * | 11/2006 | Bakfan et al. | 375/240.12 |
| 2006/0271363 | A1 | 11/2006 | Murashima | |
| 2007/0168189 | A1 | 7/2007 | Tamura et al. | |
| 2008/0027711 | A1 * | 1/2008 | Rajendran et al. | 704/201 |
| 2008/0201137 | A1 | 8/2008 | Vos et al. | |

FOREIGN PATENT DOCUMENTS

| | | |
|---|---|---|
| JP | 06-083391 | 3/1994 |
| JP | 7-13584 | 1/1995 |
| JP | 07-092989 | 4/1995 |
| JP | 07-191696 | 7/1995 |
| JP | 09-152894 | 6/1997 |
| JP | 10-097269 | 4/1998 |
| JP | 2001-236085 | 8/2001 |
| JP | 2001-350488 | 12/2001 |
| JP | 2005-156887 | 6/2005 |
| JP | 2006-209069 | 8/2006 |
| JP | 2007-233267 | 9/2007 |

* cited by examiner

NON-SPEECH SECTION DETECTING METHOD AND NON-SPEECH SECTION DETECTING DEVICE

CROSS-REFERENCE TO RELATED APPLICATIONS

This application is a divisional of application Ser. No. 12/754,156, filed Apr. 5, 2010, which is a continuation, filed under 35 U.S.C. §111(a), of PCT International Application No. PCT/JP2007/074274 which has an International filing date of Dec. 18, 2007 and designated the United States of America.

FIELD

The present invention relates to a non-speech section detecting method and a non-speech section detecting device of generating frames having a given time length on the basis of sound data obtained by sampling sound; and then detecting a non-speech section.

BACKGROUND

In general, a speech recognition device used in a vehicle-mounted device such as a car navigation device detects a speech section, and then recognizes a word sequence on the basis of the feature of the speech calculated for the detected speech section. When the detection of a speech section is erroneous, the rate of speech recognition in the section is degraded. Thus, such a speech recognition device is intended to exactly detect a speech section. Further, the speech recognition device detects a non-speech section and then excludes it from the target of speech recognition.

In an example of a basic method of detecting a speech section, a section in which the power of speech input exceeds a criterion value obtained by adding a threshold value to the estimated present background noise level is treated as a speech section. In this approach, a section containing noise having strong non-stationarity (e.g., noise sound having large power fluctuation such as buzzer sound; the sound of wiper sliding; and the echo of speech prompt) is erroneously detected as a speech section in many cases. A technique that a correction coefficient is calculated from the maximum speech power of the latest utterance and the speech recognition result at that time and then used together with the estimated background noise level so as to correct the future criterion value is disclosed in Japanese Patent Application Laid-Open No. H7-92989.

SUMMARY

A non-speech section detecting device generating a plurality of frames having a given time length on the basis of sound data obtained by sampling sound, and then detecting a non-speech section having a frame not containing voice data based on speech uttered by a person, the device including:

a calculating part calculating a bias of a spectrum obtained by converting sound data of each frame into components on a frequency axis;

a judging part judging, when the calculated bias of the spectrum has a positive value or a negative value, whether the bias is greater than or equal to a given threshold or alternatively smaller than or equal to a given threshold;

a counting part counting the number of consecutive frames judged as having a bias greater than or equal to the threshold or alternatively smaller than or equal to the threshold;

a count judging part judging whether the obtained number of consecutive frames is greater than or equal to a given value; and a detecting part detecting, when the obtained number of consecutive frames is judged as greater than or equal to the given value, the section with the consecutive frames as a non-speech section.

The object and advantages of the invention will be realized and attained by the elements and combinations particularly pointed out in the claims. It is to be understood that both the foregoing general description and the following detailed description are exemplary and explanatory and are not restrictive of the embodiment, as claimed.

DESCRIPTION OF EMBODIMENTS

Embodiment 1

Figure 1:
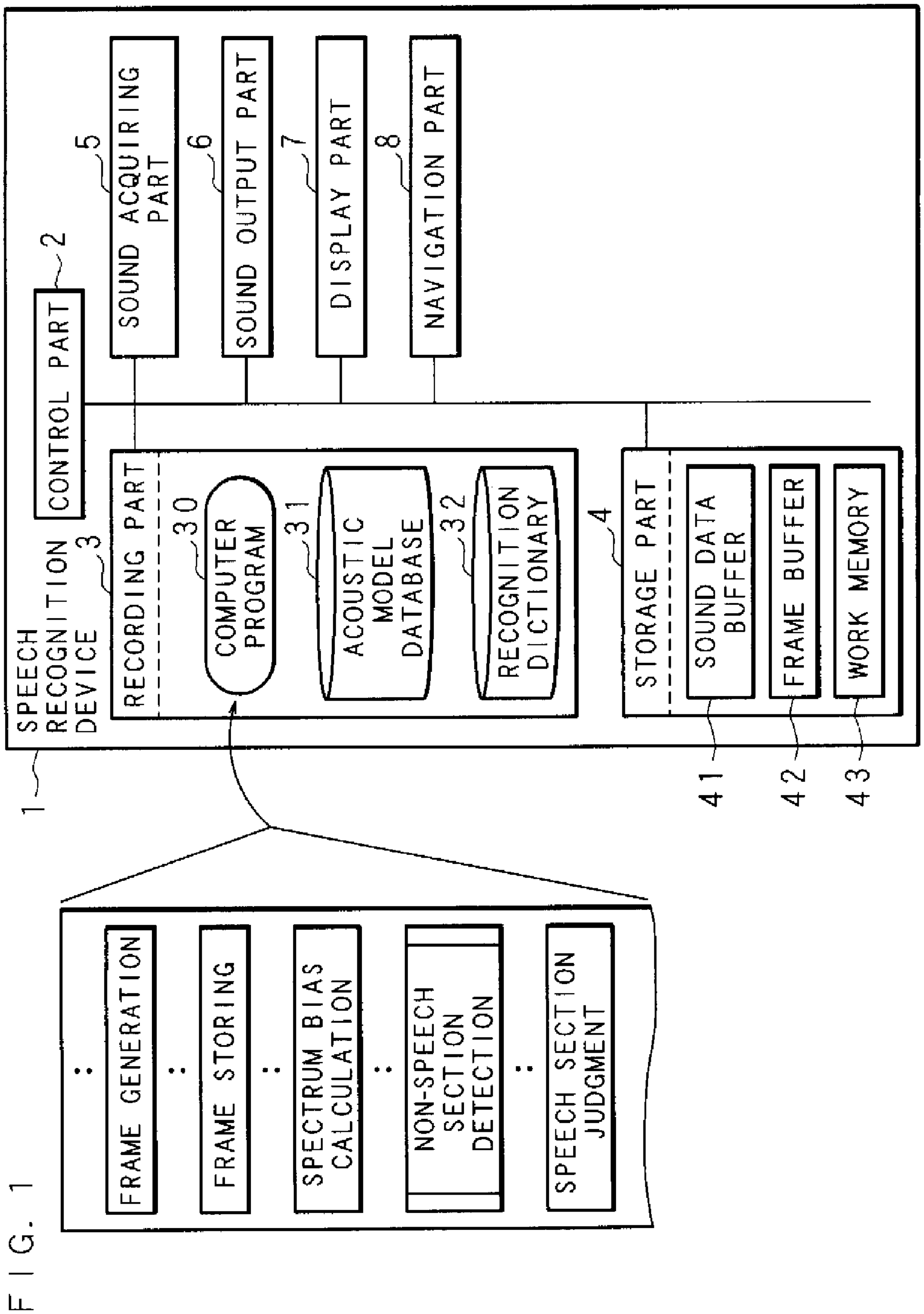
FIG. 1 is a block diagram illustrating a speech recognition device serving as an implementation example of a non-speech section detecting device.

FIG. 1 is a block diagram illustrating a speech recognition device serving as an implementation example of a non-speech section detecting device. Numeral 1 in the figure indicates a speech recognition device employing a computer like a navigation device mounted on a vehicle. The speech recognition device 1 includes: a control part 2 such as a CPU (Central Processing Unit) and a DSP (Digital Signal Processor) controlling the entirety of the device; a recording part 3 such as a hard disk and a ROM recording various kinds of information such as programs and data; a storage part 4 such as a RAM recording data that is generated temporarily; a sound acquiring part 5 such as a microphone and the like acquiring sound from the outside; a sound output part 6 such as a speaker and the like outputting sound; a display part 7 such as a liquid crystal display monitor and the like; and a navigation part 8 executing processing concerning navigation like instruction of a route to a destination.

The recording part 3 stores a computer program 30 used for executing a non-speech section detecting method. The computer stores, in the recording part 3, various kinds of procedures contained in the recorded computer program 30, and then executes the program by the control of the control part 2 so as to operate as the non-speech section detecting device.

A part of the recording area of the recording part 3 is used as various kinds of databases such as an acoustic model database (DB) 31 recording an acoustic model for speech recognition and a recognition dictionary 32 recording syntax and recognition vocabulary written by phoneme or syllable definition corresponding to the acoustic model.

A part of the storage area of the storage part 4 is used as a sound data buffer 41 recording sound data digitized by sampling, with a given period, sound which is an analog signal acquired by the sound acquiring part 5. Another part of the storage area of the storage part 4 is used as a frame buffer 42 storing data such as a feature (feature quantity) extracted from each frame obtained by partitioning the sound data into a given time length. Yet another part of the storage area of the storage part 4 is used as a work memory 43 storing information generated temporarily.

The navigation part 8 has a position detecting mechanism such as a GPS (Global Positioning System) and a recording medium such as a DVD (Digital Versatile Disk) and a hard disk recording map information. The navigation part 8 executes navigation processing such as route search and route instruction for a route from a present location to a destination. The navigation part 8 displays a map and a route onto the display part 7, and outputs guidance by speech through the sound output part 6.

Here, the example illustrated in FIG. 1 is merely an example, and may be extended into various modes. For example, the function of speech recognition may be implemented by one or a plurality of VLSI chips, and then may be incorporated into the navigation device. Alternatively, a dedicated device for speech recognition may externally be attached to the navigation device. Further, the control part 2 may be shared by the processing of speech recognition and the processing of navigation, or alternatively, separate dedicated circuits may be employed. A co-processor executing the processing of particular arithmetic operations concerning speech recognition such as FFT (Fast Fourier Transform), DCT (Discrete Cosine Transform), and IDCT (Inverse Discrete Cosine Transform), which will be described later, may be built into the control part 2. Further, the sound data buffer 41 may be implemented as an attached circuit to the sound acquiring part 5, while the frame buffer 42 and the work memory 43 may be implemented on a memory provided in the control part 2. The speech recognition device 1 is not limited to a vehicle-mounted device such as the navigation device, and may be applied to a device of various kinds of applications performing speech recognition.

Figure 2:
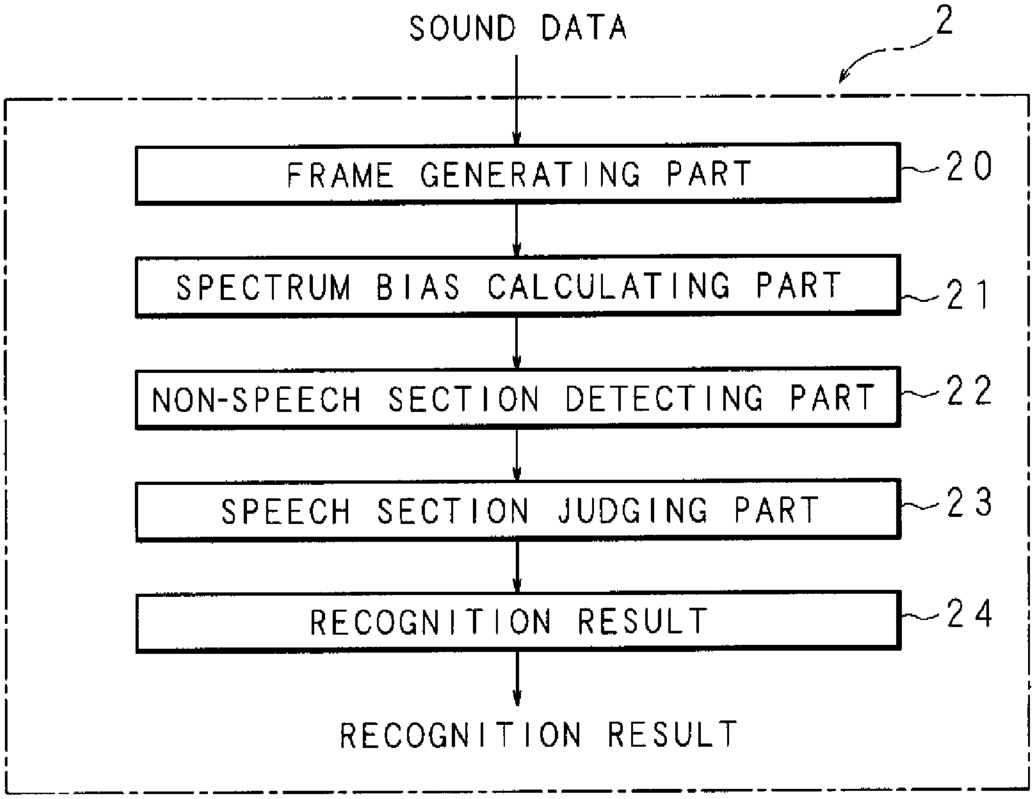
FIG. 2 is a block diagram illustrating an example of processing concerning speech recognition performed by a control part.
Figure 3:
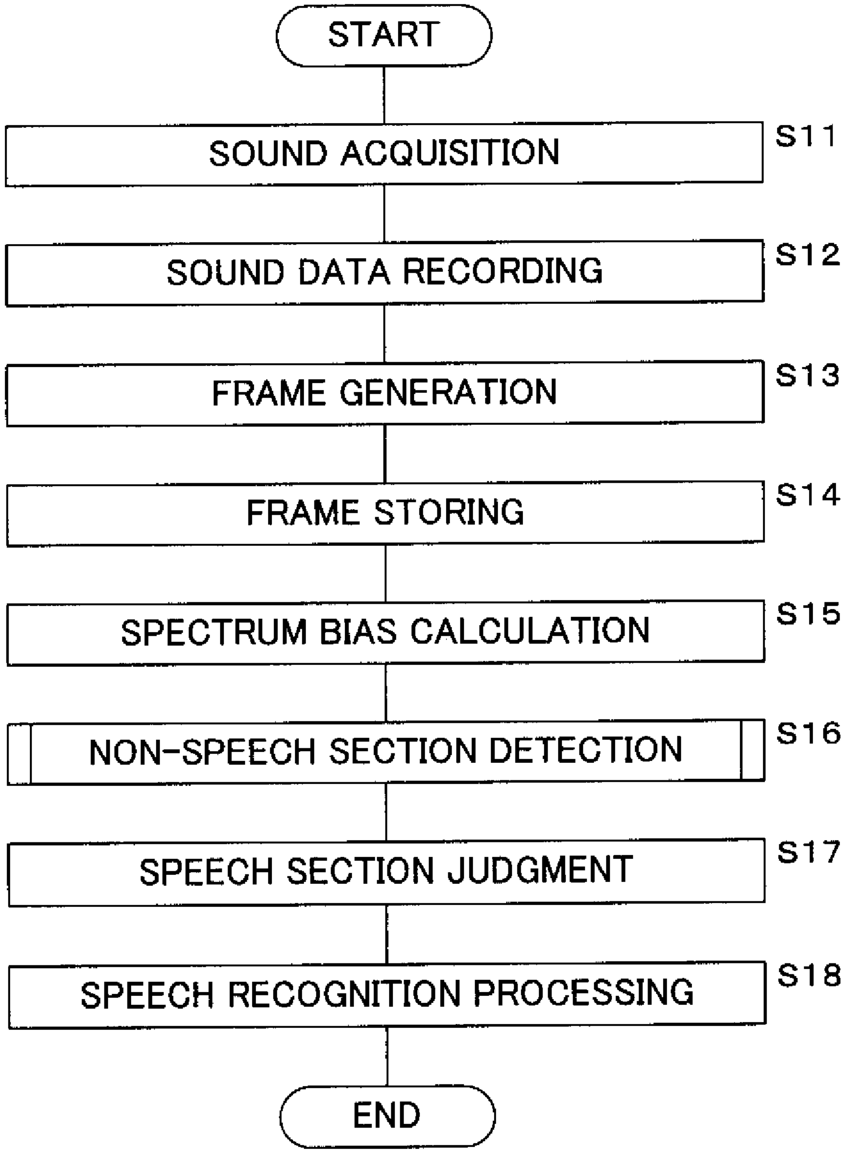
FIG. 3 is a flow chart illustrating an example of speech recognition processing performed by a control part.

Next, the processing of the speech recognition device 1 serving as an implementation example of a non-speech section detecting device is described below. FIG. 2 is a block diagram illustrating an example of processing concerning speech recognition performed by the control part 2. Further, FIG. 3 is a flow chart illustrating an example of speech recognition processing performed by the control part 2.

The control part 2 includes: a frame generating part 20 generating a frame from sound data; a spectrum bias calculating part 21 calculating the bias of the spectrum of the generated frame; a non-speech section detecting part 22 detecting a non-speech section on the basis of a judgment criterion based on the calculated bias of the spectrum; a speech section judging part 23 confirming the start/end of a speech section on the basis of the detected non-speech section; and a speech recognition part 24 recognizing the speech of the judged speech section.

The control part 2 acquires external sound as an analog signal through the sound acquiring part 5 (step S11). The control part 2 records sound data digitized by sampling the acquired sound with a given period, in the sound data buffer 41 (step S12). The external sound acquired at step S11 is sound in which various kinds of sound such as speech uttered by a person, stationary noise, and non-stationary noise are superposed on one another. The speech uttered by a person is speech serving as a target of recognition by the speech recognition device 1. The stationary noise is noise such as road noise and engine sound, and is removed by various kinds of removing methods already proposed and established. Examples of the non-stationary noise are: relay sound like those from hazard lamps and blinkers arranged on the vehicle; and mechanical noise like the sliding sound of wipers.

From the sound data stored in the sound data buffer 41, the frame generating part 20 of the control part 2 generates frames, each having a frame length of 10 msec, overlapped with one another by 5 msec (step S13). The control part 2 stores the generated frames in the frame buffer 42 (step S14). As general frame processing in the field of speech recognition, the frame generating part 20 performs high-frequency emphasis filtering processing on the data before frame division. Then, the frame generating part 20 divides the data into frames. The following processing is performed on each frame generated as described here.

For the frame provided from the frame generating part 20 via the frame buffer 42, the spectrum bias calculating part 21 calculates the bias of the spectrum described later (step S15). The bias calculating part 21 writes the calculated bias of the spectrum into the frame buffer 42. In this case, a pointer (address) to the frame buffer 42 to be used for referring to the frame and the bias of the spectrum having been written is provided on the work memory 43. That is, the pointer allows the bias calculating part 21 to access the bias of the spectrum stored in the frame buffer 42. Before the calculation of the bias of the spectrum, noise cancellation processing and spectrum subtraction processing may be performed so that the influence of noise may be eliminated.

For the frame provided from the spectrum bias calculating part 21 via the frame buffer 42, the non-speech section detecting part 22 calls a subroutine of detecting a non-speech section by using a judgment criterion based on the bias of the spectrum (step S16). The frames in the non-speech section detected by the non-speech section detecting part 22 by using the judgment criterion are sequentially provided to the speech section judging part 23 via the frame buffer 42. Not-yet-judged frames, that is, frames that may belong to a non-speech section depending on the subsequent frames, are suspended by the non-speech section detecting part 22 until all judgment criteria are used up.

The speech section judging part 23 recognizes as a speech section the section not detected as a non-speech section by the non-speech section detecting part 22. When the speech section length exceeds a given minimum speech section length L1, the speech section judging part 23 judges that a speech section is started and confirms the speech section start frame. Then, the frame where the speech section is terminated is recognized as a candidate for a speech section end point. After that, if the next speech section starts before a given maximum pause length L2 elapses, the above-mentioned speech section end point candidate is rejected and then the next termination of the speech section is awaited.

If the next speech section does not start even after the given maximum pause length L2 has elapsed, the speech section judging part 23 confirms the speech section end point candidate as the speech section end frame. When the start/end frames of the speech section have been confirmed, the speech section judging part 23 terminates the judgment of one speech section (step S17). The speech section detected as described here is provided to the speech recognition part 24 via the frame buffer 42.

Here, for the purpose of avoiding erroneous speech section detection, a speech section obtained by expanding the speech section judged by the speech section judging part 23, forward and backward by 100 msec each, may be adopted as a confirmed speech section.

By using a general technique in the field of speech recognition, the speech recognition part 24 extracts a feature vector from the digital signal of each frame in the speech section. On the basis of the extracted feature vector, the speech recognition part 24 refers to the acoustic model recorded in the acoustic model database 31 and the acoustics vocabulary and the syntax stored in the recognition dictionary 32. The speech recognition part 24 executes speech recognition processing to the end of the input data in the frame buffer 42 (to the end of the speech section) (step S18).

In FIG. 3, when one speech section is confirmed, speech recognition processing is executed and then the procedure is terminated. When a speech section is detected, speech recognition processing may be started at any frame where calculation is applicable, so that the response time may be reduced. Further, when a speech section is not detected within a given time, the processing may be terminated.

Here, the bias of a spectrum mentioned at step S15 is described below in further detail with reference to FIG. 3.

In the present implementation example, a high-frequency/low-frequency intensity is defined as a measure indicating the inclination of the spectrum in each frame of the sound data, that is, a deviation in the high-frequency range/low frequency range of the spectrum. The high-frequency/low-frequency intensity is used as the bias of the spectrum. In the present implementation example, the bias of a spectrum is expressed as the absolute value of the high-frequency/low-frequency intensity. The high-frequency/low-frequency intensity serves as an index approximating the spectral envelope. The high-frequency/low-frequency intensity is expressed by the ratio of the first order autocorrelation function based on a one-sample delay to the zero-th order autocorrelation function expressing the power of the sound data.

The autocorrelation function is extracted from the sound data for each frame (e.g., the frame width N=256 samples) which is the analysis unit. From the waveform {x(n)} of the sound data onto which a Hamming window has been applied, the autocorrelation function is calculated as a short-time autocorrelation function {c(τ)} in accordance with the following Formula 1.

[Mathematical expression 1]

$$c(\tau) = \frac{1}{N-1}\sum_{n=0}^{N-2} x(n)x(n+\tau), \quad 0 \leqq \tau \leqq 1$$

式 1

Formula 1

Further, since the ratio of the zero-th order to the first order autocorrelation functions, the common coefficient 1/(N−1) may be omitted so that the following Formula 2 may be adopted.

[Mathematical expression 2]

$$c(\tau) = \sum_{n=0}^{N-2} x(n)x(n+\tau), \quad 0 \leqq \tau \leqq 1$$

式 2

Formula 2

Further, by using the Wiener-Khintchine theorem, the autocorrelation function c(τ) may be obtained by performing inverse Fourier transform (IDFT) on a short-time spectrum S(ω). The short-time spectrum S(ω) is extracted from the sound data for each frame (e.g., the frame width N=256 samples) which is the analysis unit. The short-time spectrum S(ω) is obtained by applying a Hamming window to each frame and then performing DFT (Discrete Fourier Transform) on the data of the frame to which the window has been applied.

Here, for the purpose of reducing the amount of processing associated with the calculation, IDCT/DCT may be employed in place of the IDFT/DFT.

For the autocorrelation function c(τ) obtained as described above, the high-frequency/low-frequency intensity A is defined as the following Formula 3 and Formula 4 by using the first order to the zero-th order ratio.

$A=c(1)/c(0)(c(0)\neq 0)$ Formula 3

$A=0(c(0)=0)$ Formula 4

In this case, A takes a value within the range $-1\leq A\leq 1$. A value closer to 1 (or −1) indicates a higher intensity in the low-frequency range (or high-frequency range) of the spectrum.

Applicable definitions of the high-frequency/low-frequency intensity are not limited to A described above. That is, the high-frequency/low-frequency intensity may be defined as: the ratio between autocorrelation functions of orders other than the zero-th order and the first order; the ratio of the power of a given frequency band to the power of a different given frequency band; MFCC; or a cepstrum obtained by performing inverse Fourier transform on a logarithmic spectrum. In addition, the high-frequency/low-frequency intensity may be defined as at least one of the ratio of the frequencies and the ratio of the powers of mutually different formants among the estimated formants. When a plurality of high-frequency/low-frequency intensities are calculated, judgment of a non-speech section may be executed in parallel on the basis of the calculated values.

FIGS. 5 to 8 are diagrams each illustrating data such as the power and the high-frequency/low-frequency intensity of the sound of sniffling, the alarm tone of a railroad crossing, and two kinds of utterance sound ("eh, tesutochu desu" (Japanese sentence; the meaning is "uh, testing") and "keiei" (Japanese word; the meaning is "operation (of a company)")). In each of FIGS. 5 to 8, the horizontal axes indicate time. The vertical axes indicate from the top part to the bottom part: the waveform of the sound data; the power (a dashed line, the left axis) and the high-frequency/low-frequency intensity A (a solid line, the right axis) of the sound data; and the spectrogram (the left axis).

Figure 5:
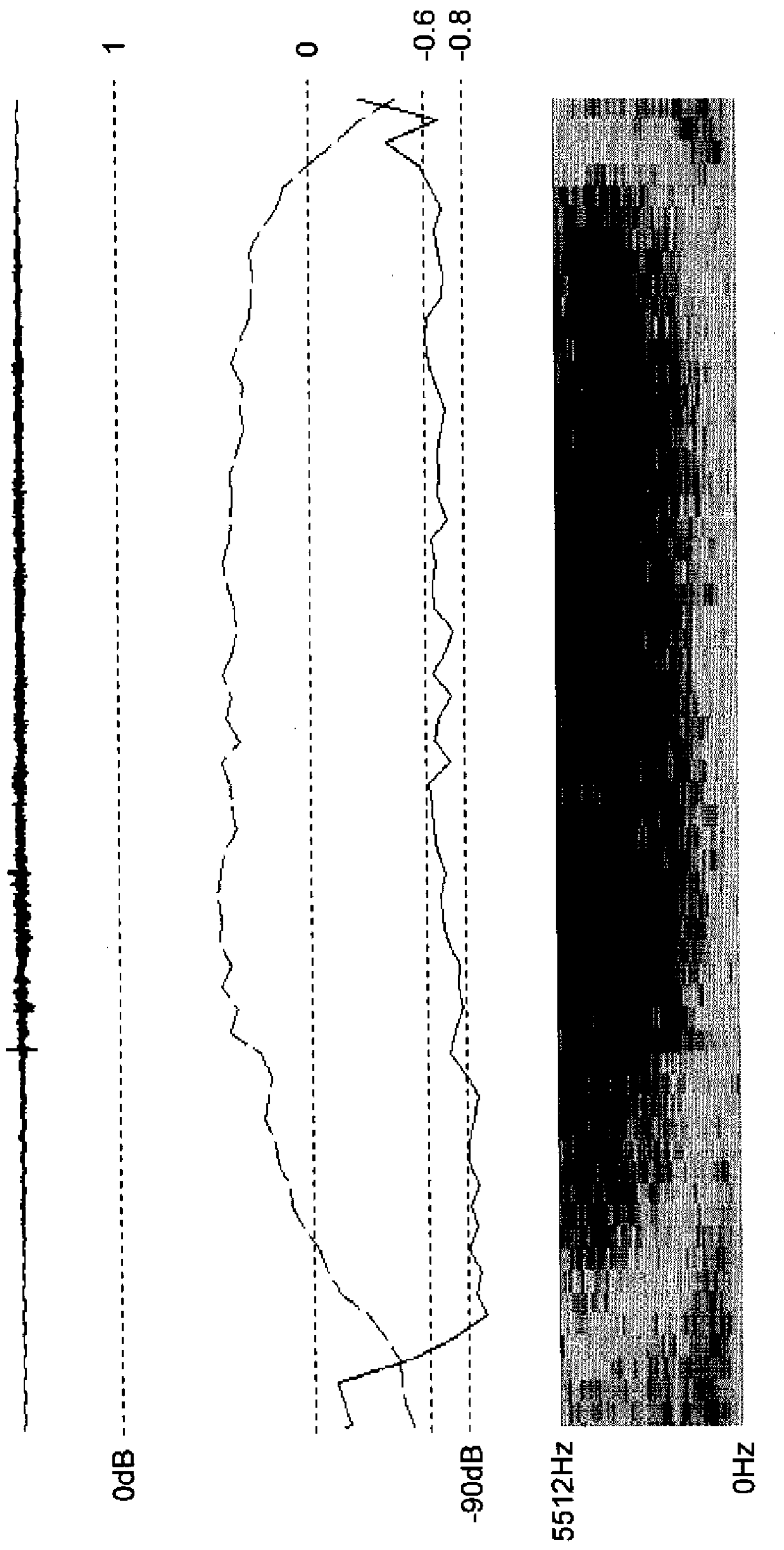
FIG. 5 is a diagram illustrating data such as the power and the high-frequency/low-frequency intensity of sound of sniffling.

In FIG. 5, in the spectrogram, the dark region is deviated to the upper part corresponding to the high-frequency range. Thus, the value A is close to −1 in this section.

Figure 6:
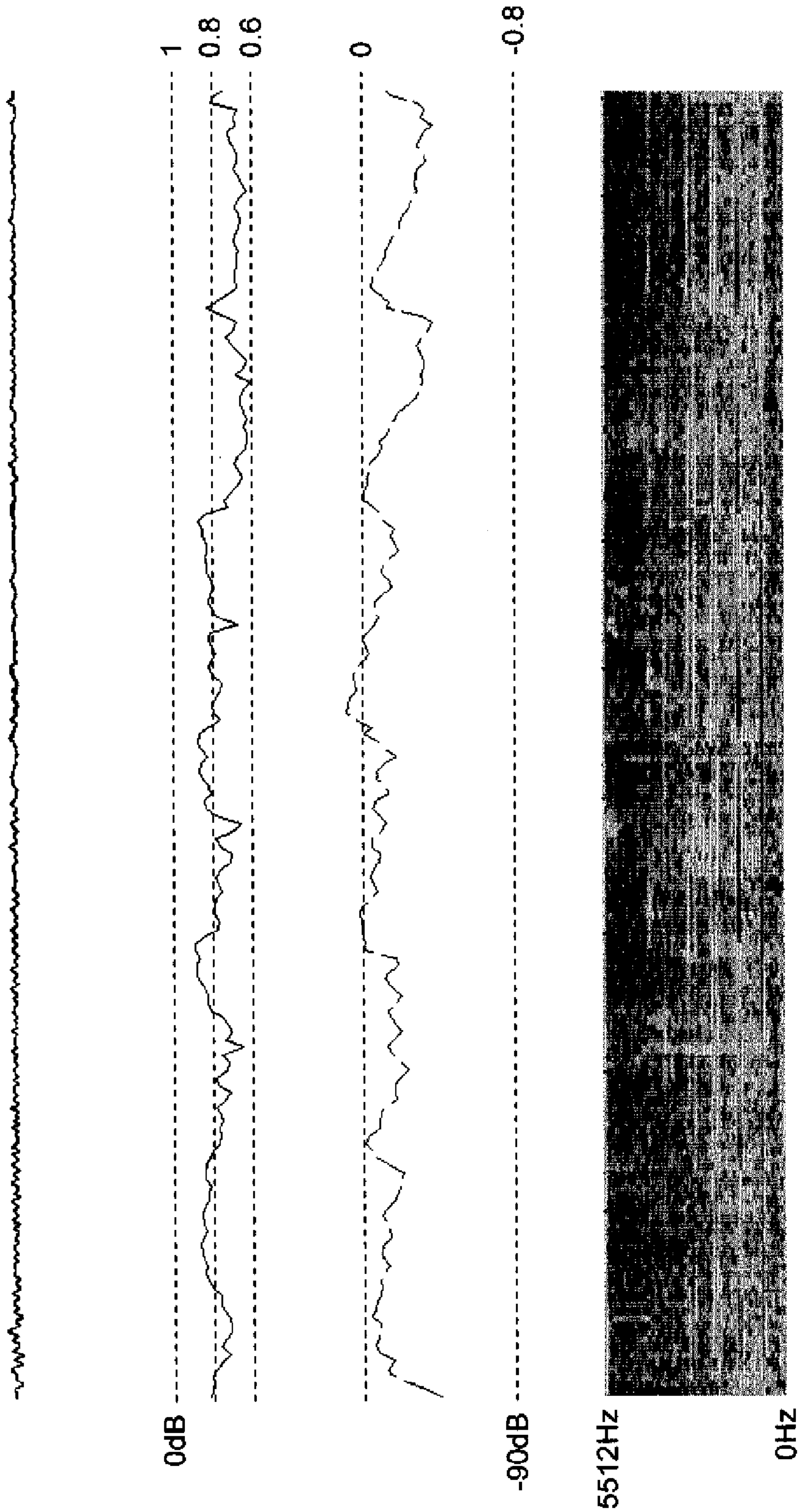
FIG. 6 is a diagram illustrating data such as the power and the high-frequency/low-frequency intensity of sound of the alarm of a railroad crossing.

In FIG. 6, in the tone signal of the alarm, dark lines appear in the lower part of the spectrogram. Thus, main components are deviated to the low-frequency range, and hence the value A is close to 1.

Figure 7:
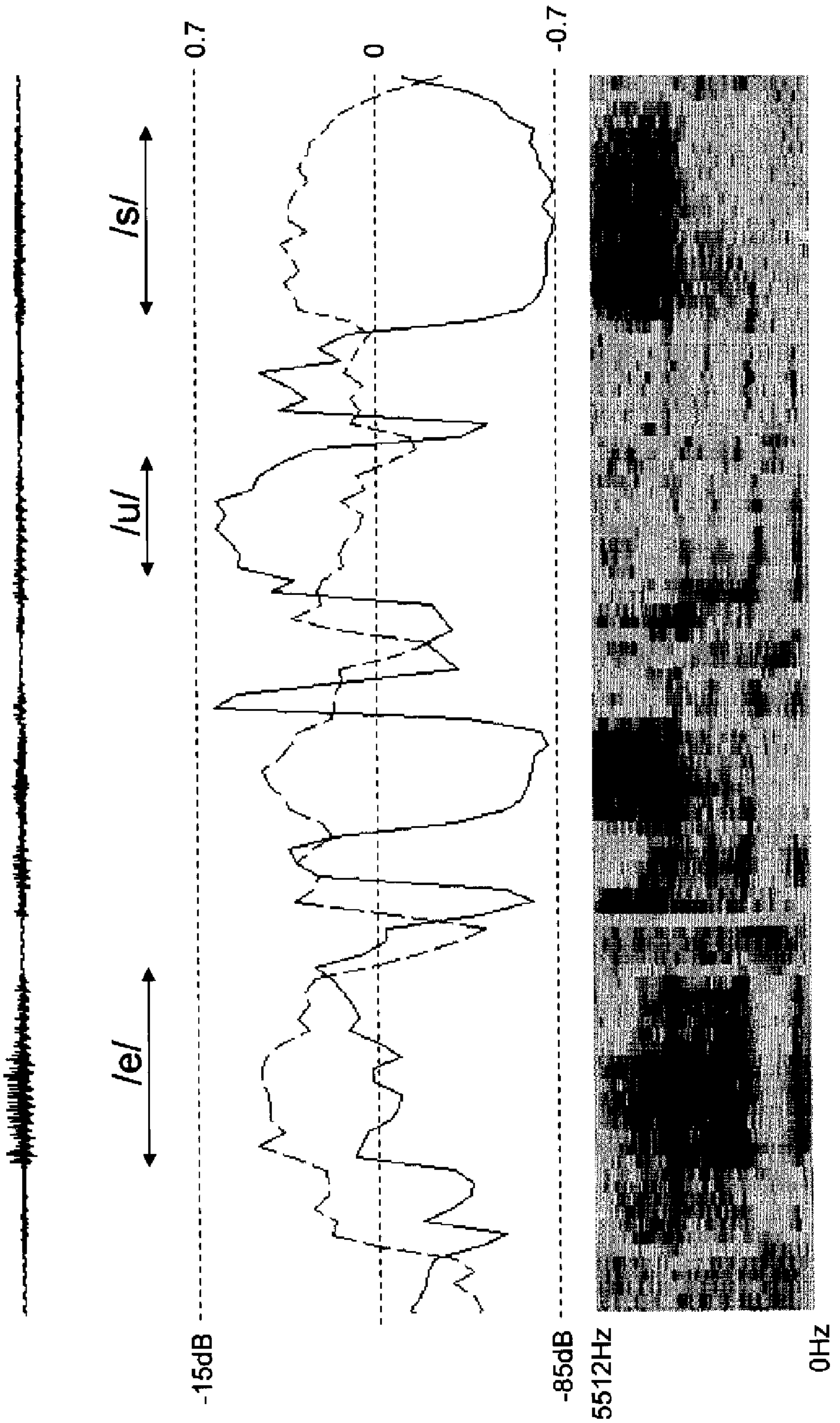
FIG. 7 is a diagram illustrating data such as the power and the high-frequency/low-frequency intensity of utterance sound ("eh, tesutochu desu" (Japanese sentence; the meaning is "uh, testing")).
Figure 8:
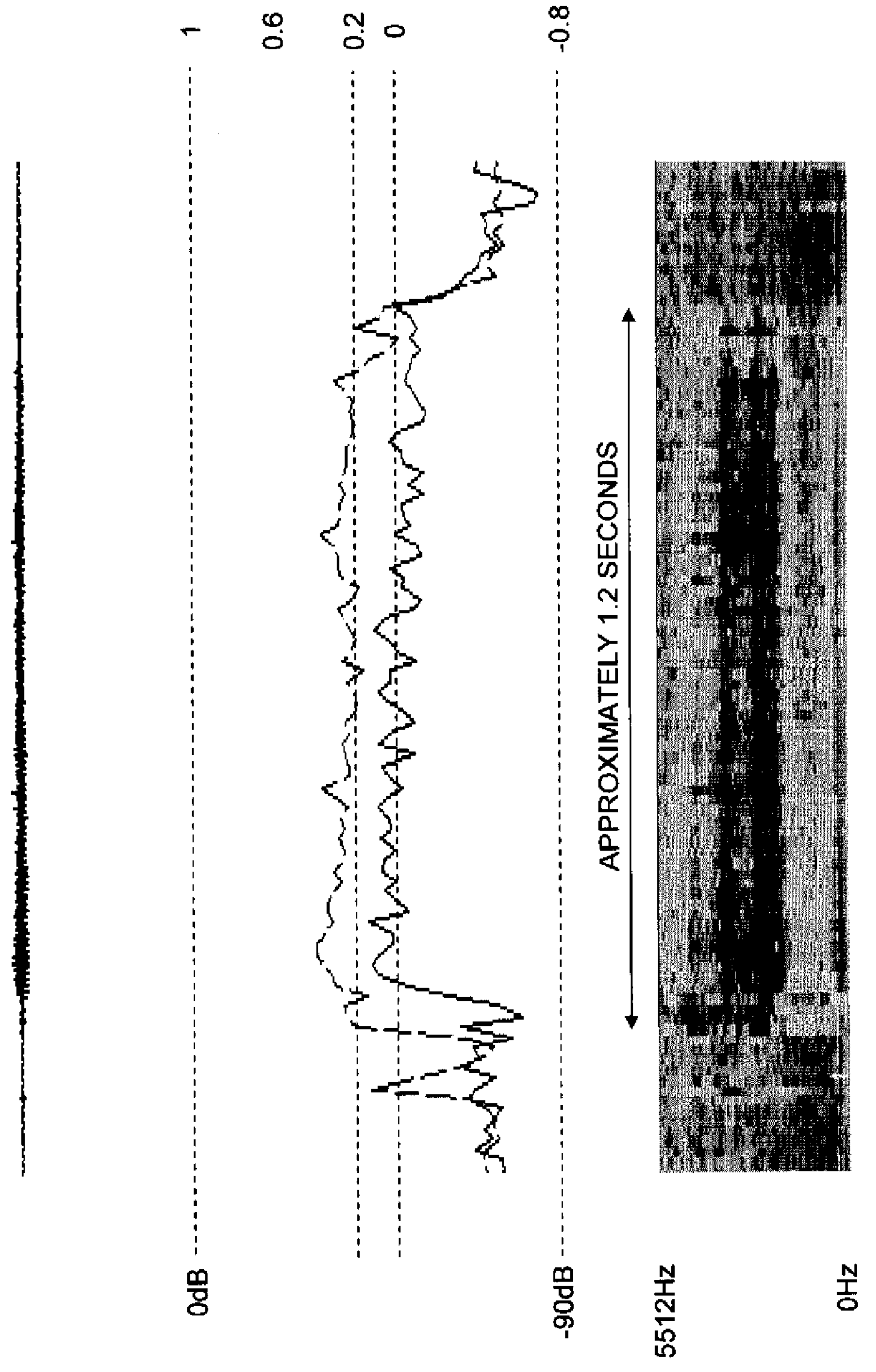
FIG. 8 is a diagram illustrating data such as the power and the high-frequency/low-frequency intensity of utterance sound ("keiei" (Japanese word; the meaning is "operation (of a company)")).

In FIG. 7, depending on the uttered phonemes, various kinds of sections appear in which the intensity is high in the high-frequency range/low frequency range or alternatively such a feature is not observed. Thus, the value A greatly fluctuates in the range of approximately $-0.7<A<0.7$. That is, in the section during utterance, the value A does not stay at a particular value for a long time, and fluctuates within a certain range. A situation that the value A stays stably even during the utterance occurs when the same phoneme continues like "su" at the end of utterance as illustrated in FIG. 7. In this case, the "su" is devoiced, and hence a fricative /s/ continues that has a high intensity in the high-frequency range. Thus, the value A stays stably near −0.7 which is close to −1 for approximately 0.3 seconds. Further, even in a section in which one phoneme continues similarly, the value A fluctuates depending on the uttered phoneme. For example, in FIG. 7, despite that a vowel /u/ continues near "u" at the end of "tesutochu", the value A is deviated to the positive direction, and takes a value of approximately 0.6.

On the other hand, in Japanese vocabulary, a particular vowel/consonant does not unnecessarily continue. Thus, in general speech recognition processing, a situation that one phoneme is continuously uttered for a long time need not be taken into consideration. Thus, assumption is made for: a time length during which each phoneme may continue in utterance of a general word or sentence; and a range that may be taken by the value A in the utterance of each phoneme. Then, when a phoneme continues unexpectedly, or alternatively when the value A has an unexpected value, the word or sentence is recognized as not being speech. For example, in FIG. 8, in some cases, "keiei" is uttered as "keh-eh", in which /e/ continues by an approximately 4-mora length except for the first /k/. This is probably a case that the same phoneme continues for the longest time in Japanese. The duration time is approximately 1.2 seconds at the longest even when the word is uttered slowly.

As seen from the subject matter described above and illustrated in FIGS. 5 to 8, as for the bias |A| of the spectrum, for example, $|A|\geq 0.7$ is not satisfied in speech sections. Further, a phoneme does not continue longer than 1.2 seconds, and $|A|\geq 0.5$ is not satisfied in this section. Thus, for non-speech sections, for example, the following judgment may be performed.

(a) When the situation of $|A|\geq 0.7$ continues for 0.1 seconds or longer, this section is recognized as a non-speech section.

(b) When the situation $|A|\geq 0.5$ continues for 1.2 seconds or longer, this section is recognized as a non-speech section.

Further, the above-mentioned judgment may be divided further as follows.

(c) When the situation $|A|\geq 0.6$ continues for 0.5 seconds or longer, this section is recognized as a non-speech section.

Here, since the frame length is constant, the threshold in terms of the duration time of frames may be replaced by a threshold in terms of the number of frames within the duration. Further, depending on the transfer characteristics of the sound input system including the characteristics of the microphone of the sound acquiring part 5, in some cases, the balance between the high-frequency and the low-frequency ranges fluctuates and hence the bias |A| of the spectrum varies also. Thus, it is preferable that the threshold in the judgment described above is adjusted in accordance with the transfer characteristics of the input system.

Figure 4:
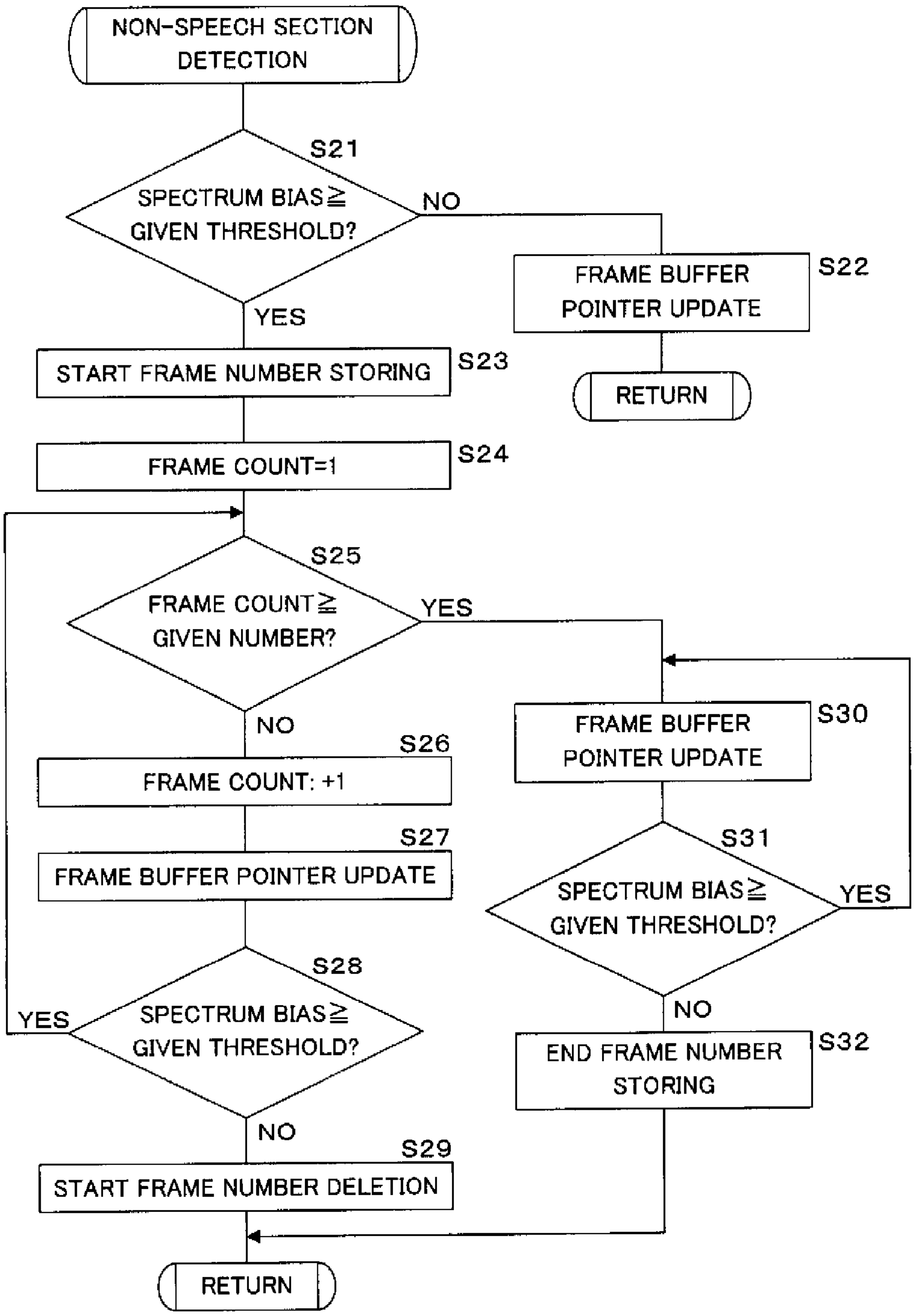
FIG. 4 is a flow chart illustrating a processing procedure performed by a control part in association with a subroutine of non-speech section detection.

A subroutine of non-speech section detection is described below. FIG. 4 is a flow chart illustrating a processing procedure performed by the control part 2 in association with a subroutine of non-speech section detection. When the subroutine of non-speech section detection is called, the control part 2 judges whether the bias of the spectrum of the frame indicated by the present pointer is greater than or equal to a given threshold (e.g., 0.7 described above) (step S21). When it is judged as being smaller than the given threshold (step S21: NO), the control part 2 updates the pointer indicating the frame buffer 42 stored on the work memory 43, backward by one frame (step S22), and then returns the procedure.

As a result, the control part 2 returns the procedure without detecting a non-speech section.

When it is judged as being greater than or equal to the given threshold (step S21: YES), the control part 2 stores the frame number of the frame indicated by the present pointer, as a "start frame number" in the work memory 43 (step S23). Then, the control part 2 initializes into "1" the stored value of "frame count" provided on the work memory 43 (step S24). Here, the "frame count" is used for counting the number of frames where comparison judgment between the bias of the spectrum and the given threshold has been performed.

After that, the control part 2 judges whether the memory contents value of "frame count" is greater than or equal to a given value (e.g., 10 which is the number of frames contained within 0.1 seconds described above) (step S25). When it is judged as being smaller than the given value (step S25: NO), the control part 2 adds "1" to the memory contents of "frame count" (step S26). The control part 2 updates the pointer indicating the frame buffer, backward by one frame (step S27). Then, the control part 2 judges whether the bias of the spectrum of the frame indicated by the present pointer is greater than or equal to the given threshold (step S28).

When the bias of the spectrum is judged as greater than or equal to the given threshold (step S28: YES), the control part 2 returns the procedure to step S25.

When the bias of the spectrum is judged as smaller than the given threshold (step S28: NO), the control part 2 deletes the contents of "start frame number" (step S29), and then returns the procedure.

As a result, the control part 2 returns the procedure without detecting a non-speech section.

When, at step S25, the memory contents value of "frame count" is judged as greater than or equal to the given value (step S25: YES), the control part 2 goes to the processing of detecting the end frame of the non-speech section. The control part 2 updates the pointer indicating the frame buffer, backward by one frame (step S30). Then, the control part 2 judges whether the bias of the spectrum of the frame indicated by the present pointer is greater than or equal to the given threshold (step S31).

When the bias of the spectrum is judged as greater than or equal to the given threshold (step S31: YES), the control part 2 returns the procedure to step S30. When the bias of the spectrum is judged as smaller than the given threshold (step S31: NO), the control part 2 stores the frame number of the frame preceding to the frame indicated by the present pointer, as an "end frame number" in the work memory 43 (step S32), and then returns the procedure.

As a result, the section partitioned by the "start frame number" and the "end frame number" is recognized as a detected non-speech section.

In Embodiment 1, when frames where the bias |A| of the spectrum calculated from the sound data of each frame is greater than or equal to, for example, 0.7 continue in a number greater than or equal to a number corresponding to the duration time of 0.1 seconds, the section between the first frame where the bias of the spectrum becomes greater than or equal to 0.7 and the last frame having a bias greater than or equal to 0.7 is detected as a non-speech section.

Thus, in the present Embodiment 1, a section in which frames having a high bias of the spectrum and having a feature of non-speech continue to an extent of being unlike speech is detected as a non-speech section. Accordingly, correction of the criterion value based on an utterance of a person is not necessary. Thus, even under an environment where noise of a large power or noise of strong non-stationarity is generated, a non-speech section may accurately be detected regardless of the timing before or after the utterance.

Embodiment 2

Embodiment 2 is a mode that a speech section detecting device based on the estimated background noise power is employed together with the non-speech section detecting device according to Embodiment 1.

Figure 9:
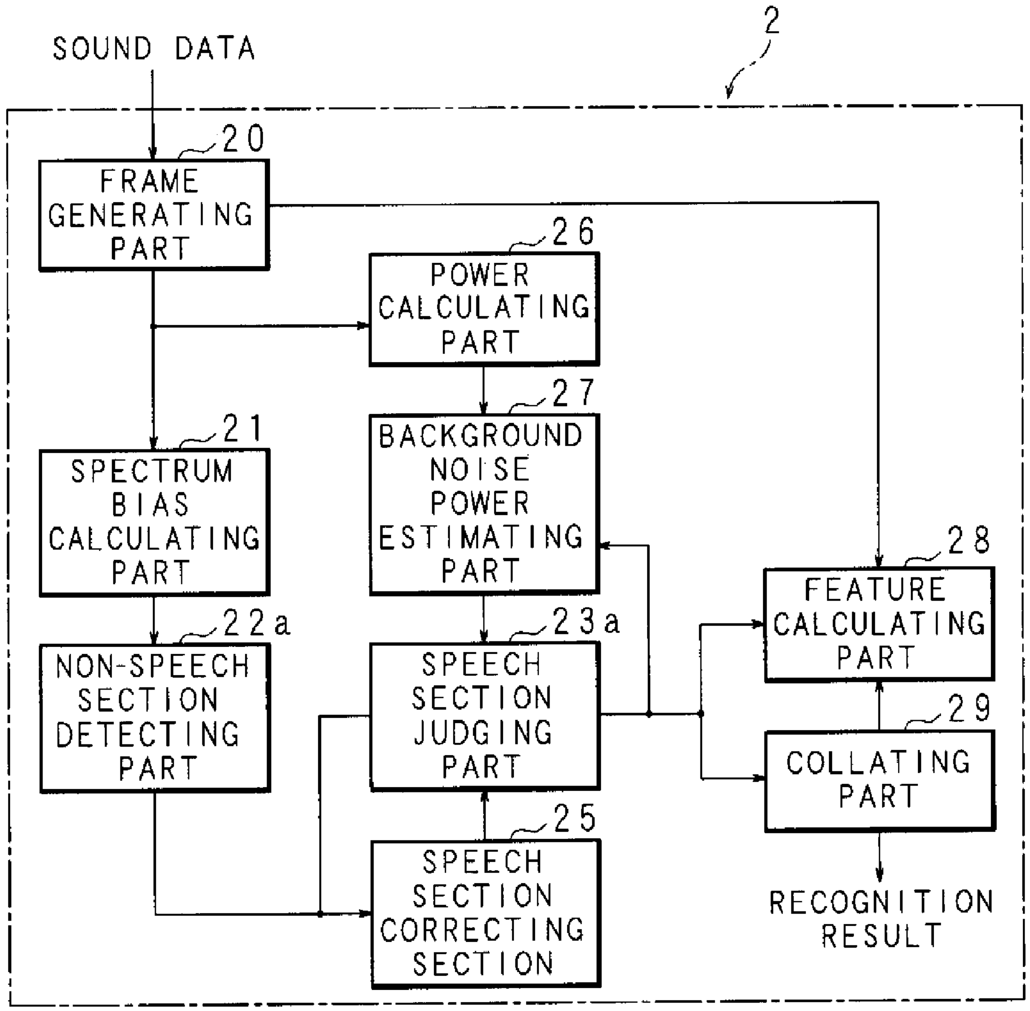
FIG. 9 is a block diagram illustrating an example of processing concerning speech recognition performed by a control part of a speech recognition device serving as an implementation example of a non-speech section detecting device according to Embodiment 2.

FIG. 9 is a block diagram illustrating an example of processing concerning speech recognition performed by a control part 2 of a speech recognition device 1 serving as an implementation example of a non-speech section detecting device according to Embodiment 2.

The control part 2 includes: a frame generating part 20; a spectrum bias calculating part 21; a non-speech section detecting part 22*a* detecting a non-speech section by using a judgment criterion based on the calculated bias of the spectrum; a speech section judging part 23*a* confirming the start/end of a speech section on the basis of the detected non-speech section; a feature calculating part 28 calculating the feature used for collation in speech recognition of the confirmed speech section; and a collating part 29 performing collation processing of speech recognition by using the calculated feature.

The control part 2 further includes: a power calculating part 26 calculating the power of the sound data of the frame generated by the frame generating part 20; a background noise power estimating part 27 estimating the background noise power on the basis of the calculated power value; and a speech section correcting section 25 notifying the speech section judging part 23*a* of the frame number for a frame to be corrected.

The non-speech section detecting part 22*a* provides the frame number of a detected non-speech section to the speech section judging part 23*a* and the speech section correcting section 25.

When a frame having been detected as belonging to a non-speech section by the non-speech section detecting part 22*a* is judged as belonging to a speech section by the speech section judging part 23*a*, the speech section correcting section 25 provides the speech section judging part 23*a* with a given correcting signal and the frame number of a frame to be corrected.

The power calculating part 26 calculates the power of the sound data of each frame provided by the frame generating part 20, and then provides the calculated power value to the background noise power estimating part 27.

Here, before the calculation of the power, noise cancellation processing and spectrum subtraction processing may be performed so that the influence of noise may be eliminated.

The background noise power estimating part 27 unconditionally recognizes the head frame of the sound data as noise, and then adopts the power of the sound data of the frame as the initial value for the estimated background noise power. After that, the background noise power estimating part 27 excludes the frames within the speech section notified by the speech section judging part 23*a*. As for the second and subsequent frames of the sound data, the background noise power estimating part 27 calculates the simple moving average of the power of the latest two frames. On the basis of the calculated moving average, the background noise power estimating part 27 updates the estimated background noise power of each frame. Here, in place of calculation from the simple moving average of the power, the update value of the estimated background noise power may be calculated by using an IIR (Infinite Impulse Response) filter.

When correction of the estimated background noise power is notified from the speech section judging part 23*a*, the background noise power estimating part 27 overwrites and corrects the estimated background noise power by using the power calculated from the sound data of the presently newest frame among the frames corrected into a non-speech section.

Here, when correction of the estimated background noise power is notified from the speech section judging part 23*a*, the background noise power estimating part 27 may calculate the estimated background noise power for the sound data of the frame corrected into a non-speech section. Alternatively, the estimated background noise power may be overwritten for the first time when the given-N-th correction (N is a natural number greater than or equal to 2) is notified, by using the power calculated from the sound data of the presently newest frame. This avoids a situation that a speech section is not detected owing to an excessive increase in the estimated background noise level when the background noise level fluctuates up and down.

When the power of the sound data of each frame becomes greater than "the estimated background noise power+a given threshold a", the speech section judging part 23*a* judges the frame as a speech section. Further, when the given correcting signal described above is provided by the speech section correcting section 25, the speech section judging part 23*a* corrects the judgment result of the speech section on the basis of the frame number to be corrected. Then, when the judged speech section continues for a duration time greater than or equal to the shortest input time length and shorter than or equal to the longest input time length, the speech section judging part 23*a* confirms the present speech section. The speech section judging part 23*a* notifies the feature calculating part 28, the collating part 29 and the background noise power estimating part 27, of the judged speech section.

The speech section judging part 23*a* notifies the background noise power estimating part 27 of an instruction for correcting the estimated background noise power on the basis of the sound data of the frame corrected into a non-speech section.

The feature calculating part 28 calculates the feature used for collation of speech recognition for the section finally confirmed as a speech section by the speech section judging part 23*a*. The feature described here indicates, for example, a feature vector whose similarity to the acoustic model recorded in the acoustic model database 31 is allowed to be calculated. The feature is calculated by converting a digital signal having undergone frame processing. The feature in the present embodiment is an MFCC (Mel Frequency Cepstrum Coefficient). However, the feature may be an LPC (Linear Predictive Coding) cepstrum or an LPC coefficient. As for the MFCC, the digital signal having undergone frame processing is processed by FFT so that an amplitude spectrum is obtained. Then, as for the MFCC, processing is performed by a mel filter bank whose center frequencies are located at regular intervals in the mel frequency domain. Then, the logarithm of the processing result is transferred by DCT. As for the MFCC, coefficients of low orders such as the first order to the fourteenth order are used as a feature vector called an MFCC. Here, the orders are determined by various kinds of factors such as the sampling frequency and the application, and their numerical values are not limited to particular ones.

For the speech section judged and confirmed as a speech section by the speech section judging part 23*a*, on the basis of the feature vector which is a feature calculated by the feature calculating part 28, the collating part 29 refers to the acoustic model recorded in the acoustic model database 31, and the recognition vocabulary and the syntax recorded in the recognition dictionary 32, to execute speech recognition processing. Further, on the basis of the recognition result, the collating part 29 controls the output of other input and output parts such as the sound output part 6 and the display part 7.

In other points, like parts to those of Embodiment 1 are designated by like numerals, and hence their descriptions will not be repeated.

As such, in Embodiment 2, the detection result by the speech section detecting device based on the power of sound data is corrected by the non-speech section detecting device. This improves the overall accuracy in speech section detection.

Embodiment 3

Figure 10:
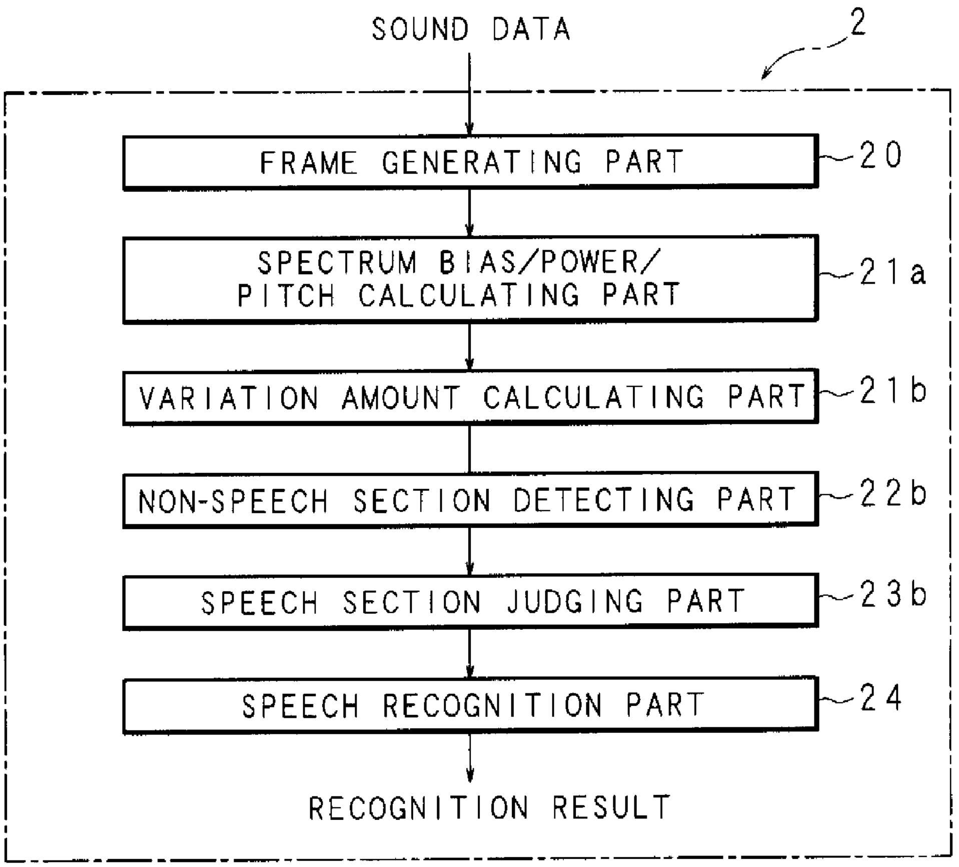
FIG. 10 is a block diagram illustrating an example of processing concerning speech recognition performed by a control part of a speech recognition device serving as an implementation example of a non-speech section detecting device according to Embodiment 3.
Figure 11:
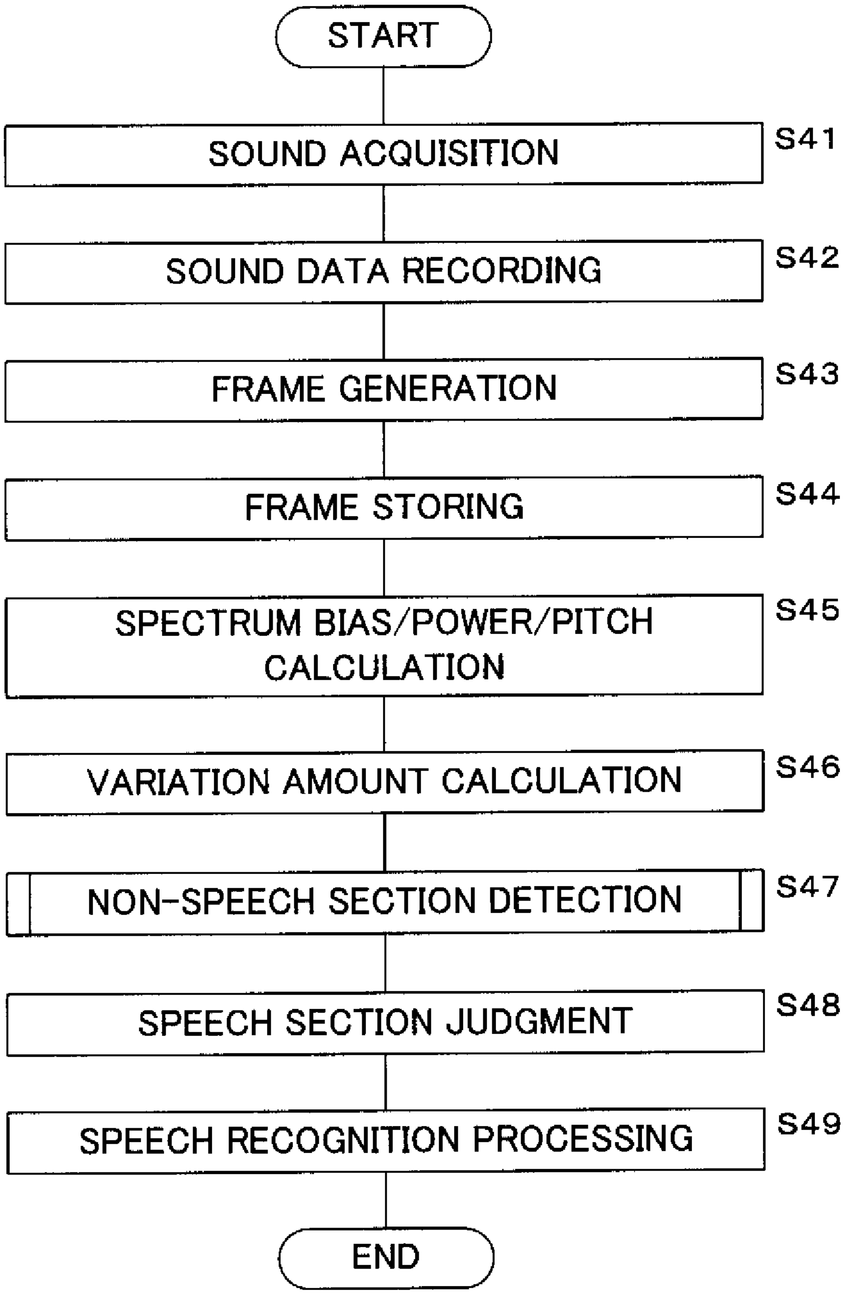
FIG. 11 is a flow chart illustrating an example of speech recognition processing performed by a control part.

In Embodiments 1 and 2, a non-speech section has been detected on the basis of the bias of the spectrum. In Embodiment 3, a non-speech section is detected on the basis of the amount of variation relative to the preceding frame with respect to the bias of the spectrum, the power of the sound data, or the pitch of the sound data. Further, in Embodiment 3, a section to be excluded from the target of non-speech section detection is detected, and further a section having been excluded from the detection target is restored. FIG. 10 is a block diagram illustrating an example of processing concerning speech recognition performed by a control part 2 of a speech recognition device 1 serving as an implementation example of a non-speech section detecting device according to Embodiment 3. Further, FIG. 11 is a flow chart illustrating an example of speech recognition processing performed by the control part 2.

The control part 2 includes: a frame generating part 20 generating frames from sound data; a spectrum bias/power/pitch calculating part 21*a* calculating the spectrum bias/power/pitch of the sound data of each generated frame; a variation amount calculating part 21*b* calculating the amount of variation relative to the preceding frame with respect to the calculated spectrum bias/power/pitch; a non-speech section detecting part 22*b* detecting a non-speech section on the basis of a judgment criterion based on the calculated variation amount; a speech section judging part 23*b* confirming the start/end of a speech section on the basis of the detected non-speech sections; and a speech recognition part 24 recognizing speech in the judged speech section.

The processing at steps S41 to S44 is similar to that at steps S11 to S14 in FIG. 3. Thus, description is not repeated. The following processing is performed on each frame generated in the processing at steps S41 to S44.

For the frame provided by the frame generating part 20 via the frame buffer 42, the spectrum bias/power/pitch calculating part 21*a* calculates at least one of the bias of the spectrum of the sound data, the power of the sound data, and the pitch of the sound data (step S45). The spectrum bias/power/pitch calculating part 21*a* writes at least one of the calculated the bias of the spectrum, power and pitch in the frame buffer 42.

Here, the quantity to be calculated here is not limited to the spectrum bias/power/pitch which is a scalar quantity. Instead, the power spectrum, the amplitude spectrum, the MFCC, the LPC cepstrum, the LPC coefficient, the PLP coefficient or the LSP parameter may be employed, which are vectors expressing acoustical characteristics.

For at least one of the bias of the spectrum, the power of the sound data, and the pitch of the sound data written in the frame buffer 42, the variation amount calculating part 21*b* calculates the amount of variation relative to the preceding frame, and then writes the obtained result into the frame buffer 42 (step S46). In this case, a pointer (address) to the frame buffer 42 to be used for referring to the frame and the variation amount having been written is provided and initialized on the work memory 43.

For the frame provided by the variation amount calculating part 21*b* via the frame buffer 42, the non-speech section detecting part 22*b* calls a subroutine of detecting a non-speech section by using a judgment criterion based on the variation amount (step S47). The frames in the non-speech section detected by the non-speech section detecting part 22*b* by using the judgment criterion are sequentially provided to the speech section judging part 23*b* via the frame buffer 42. After that, the speech section judging part 23*b* confirms the start/end frames of the speech section so as to judge the speech section (step S48). Then, the speech recognition part 24 executes speech recognition processing to the end of the input data in the frame buffer 42 (to the end of the speech section) (step S49).

Here, the variation amount mentioned at step S46 with reference to FIG. 11 is described below in further detail.

In the sound data of utterance by a person, time-dependent fluctuation of a particular amount is not avoided with respect to the spectrum bias, the power, and the pitch. Thus, when no fluctuation is observed with respect to the above-mentioned indices of the sound data, it is appropriate that the data is recognized as non-speech.

For example, when the high-frequency/low-frequency intensity A of the t-th frame (referred to as a frame t, hereinafter; t=1, 2, . . . ) is expressed by A(t), the variation amount in the frame t is defined by the following Formula 5 and Formula 6.

$$C(t)=|A(t)-A(t-1)| \text{ for } t>1 \quad \text{Formula 5}$$

$$C(t)=0 \text{ for } t=1 \quad \text{Formula 6}$$

In this case, for a non-speech section, for example, the following judgment may be performed.

(d) When frames having C(t)<0.05 continue for 0.5 seconds or longer, the section is recognized as a non-speech section.

(e) When frames having C(t)<0.1 continue for 1.2 seconds or longer, the section is recognized as a non-speech section.

Here, the judgment based on C(t) is not limited to the above-mentioned (d) and (e). That is, different conditions may be set up by differently combining a threshold concerning the variation amount and a threshold concerning the duration time. Further, since the frame length is constant, the threshold in terms of the duration time of frames may be replaced by a threshold in terms of the number of frames within the duration.

Further, the variation amount may be calculated separately for the bias of the spectrum, the power of the sound data and the pitch of the sound data. Then, step S47 in FIG. 11 may be executed for each variation amount so that a non-speech section may be detected independently.

On the other hand, a frame having a large variation amount in contrast to those described in the judgment criteria (d) and (e) has a possibility of not being a non-speech frame. Thus, for example, it is effective that the following judgment (f) is added.

(f) When C(t)>0.5, frames from t−w+1 (e.g., w=3) to t+w−1 are excluded from the target of non-speech section detection. That is, a frame section including forward w frames and backward w frames relative to the present frame is excluded from the target of non-speech section detection.

Further, regardless of the result of the above-mentioned judgment (f), when the number of consecutive frames having a large variation amount is smaller than a given value, the section has a possibility of being a non-speech section where the variation amount has increased accidentally. Thus, for example, it is preferable that the following judgment (g) is added further.

(g) In a case that the number of consecutive frames judged as having a large variation amount by the judgment (f) is smaller than or equal to a given value and that the section excluded from the target of non-speech section detection by the judgment (f) is located between non-speech sections, the result of the judgment (f) is nullified and the section is detected as a non-speech section.

Figure 12:
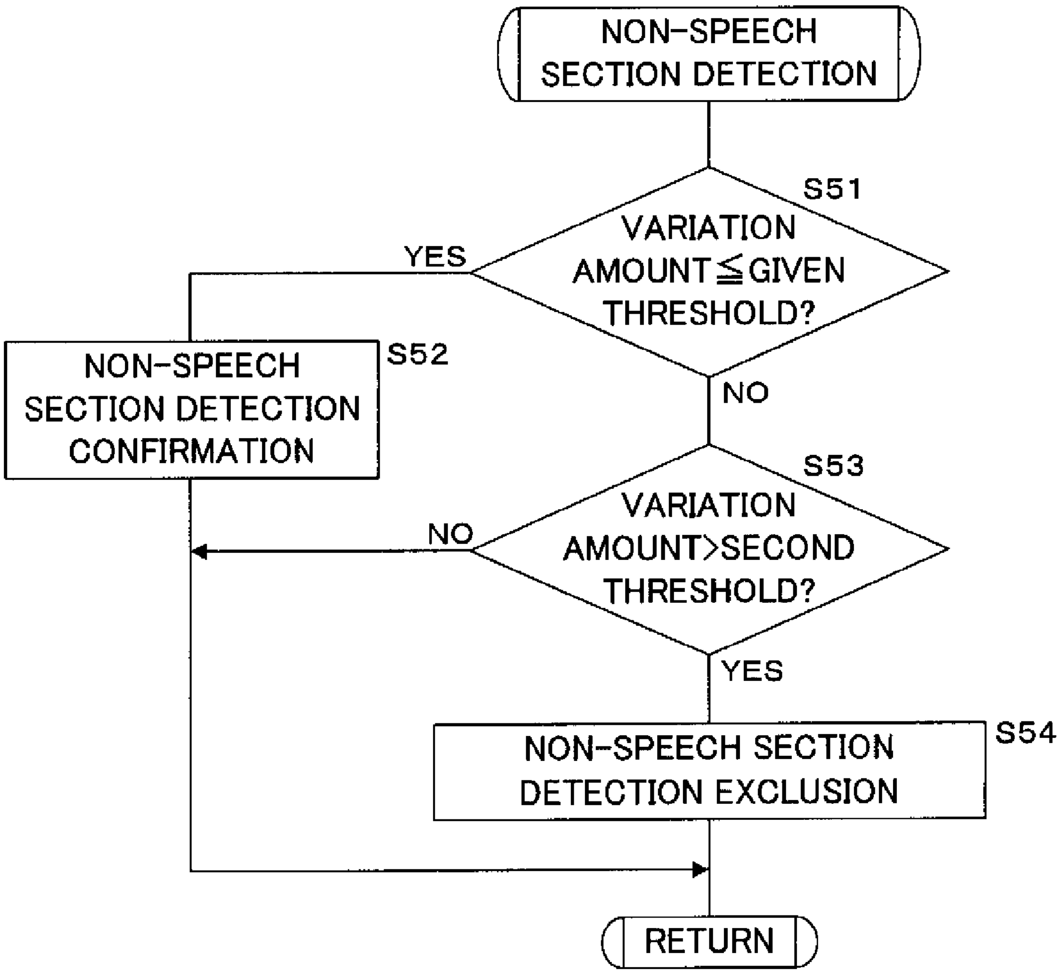
FIG. 12 is a flow chart illustrating a processing procedure performed by a control part in association with a subroutine of non-speech section detection.

A subroutine of non-speech section detection is described below. FIG. 12 is a flow chart illustrating a processing procedure performed by the control part 2 in association with a subroutine of non-speech section detection. When the subroutine of non-speech section detection is called, the control part 2 judges whether the variation amount of the frame indicated by the present pointer is smaller than or equal to a given threshold (e.g., 0.05 described above) (step S51). When it is judged as being smaller than or equal to the given threshold (step S51: YES), the control part 2 calls the subroutine of non-speech section detection confirmation (step S52), and then returns the procedure.

When the variation amount is judged as greater than the given threshold (step S51: NO), the control part 2 judges whether the variation amount exceeds a second threshold (e.g., 0.5 described above) (step S53). When it is judged as not exceeding the second threshold (step S53: NO), the control part 2 returns the procedure intact.

When the variation amount is judged as exceeding the second threshold (step S53: YES), the control part 2 calls a subroutine of non-speech section detection exclusion (step S54), and then returns the procedure.

Figure 13A:
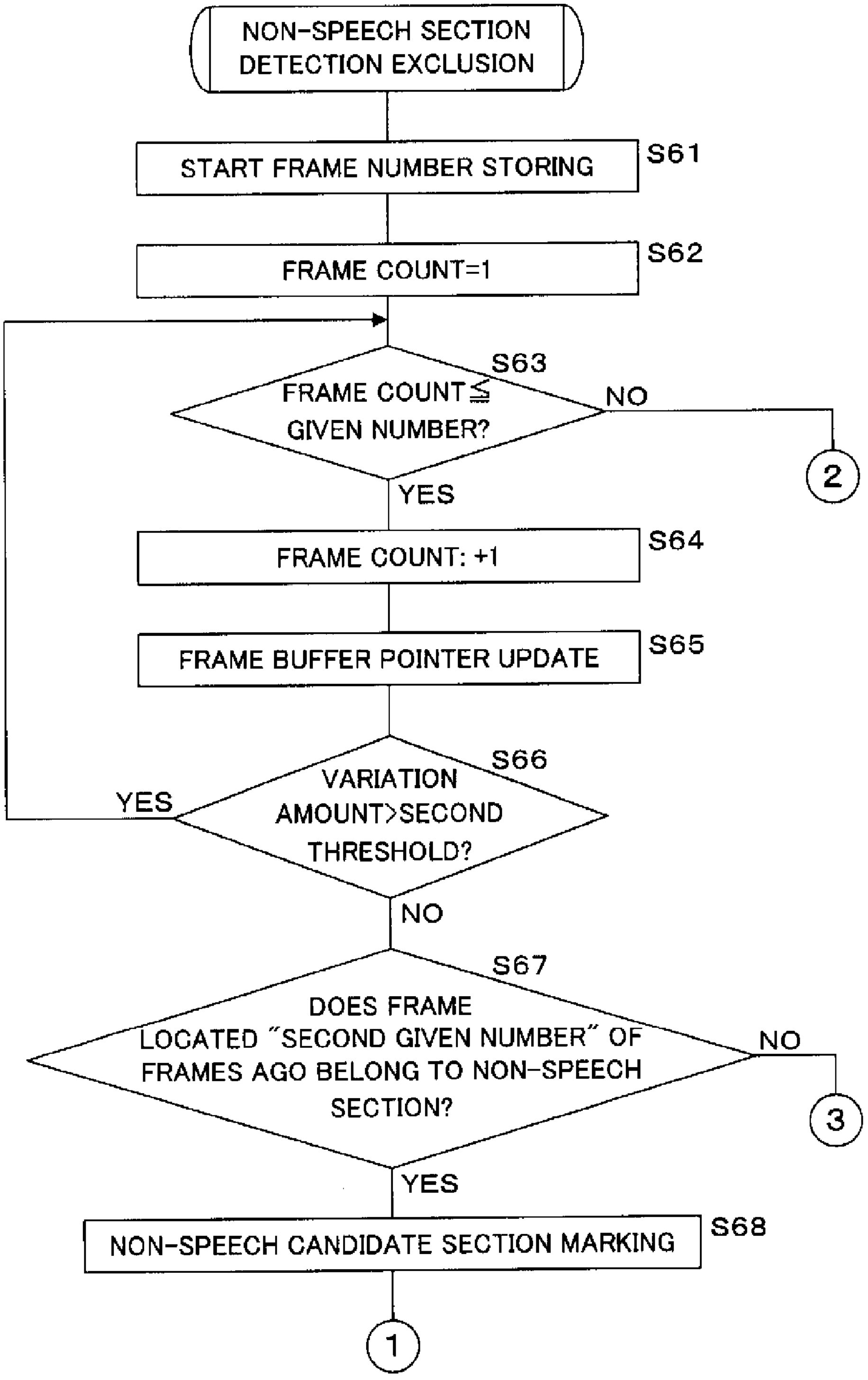
FIGS. 13A and 13B are flow charts illustrating a processing procedure performed by a control part in association with a subroutine of non-speech section detection exclusion.
Figure 13B:
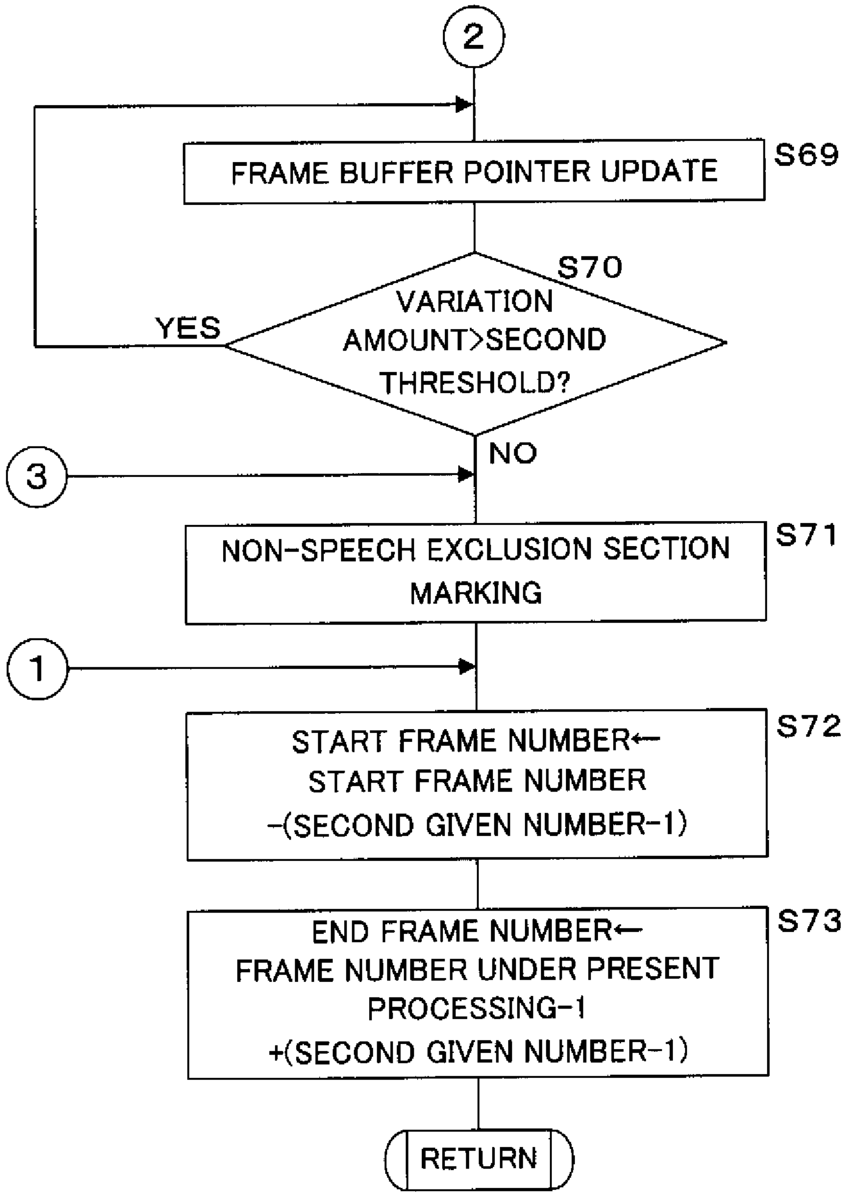
Figure 14A:
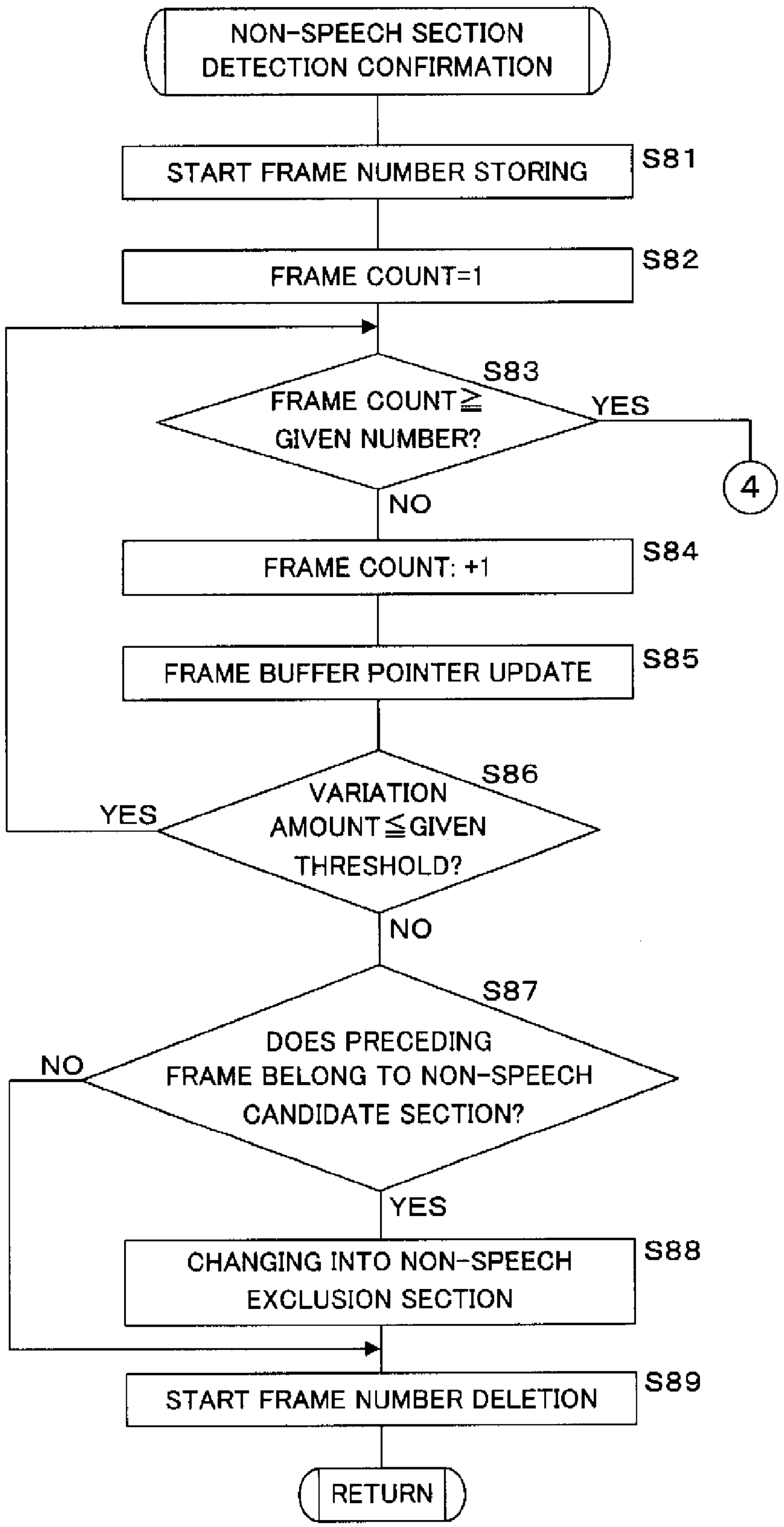
FIGS. 14A and 14B are flow charts illustrating a processing procedure performed by a control part in association with a subroutine of non-speech section detection confirmation.
Figure 14B:
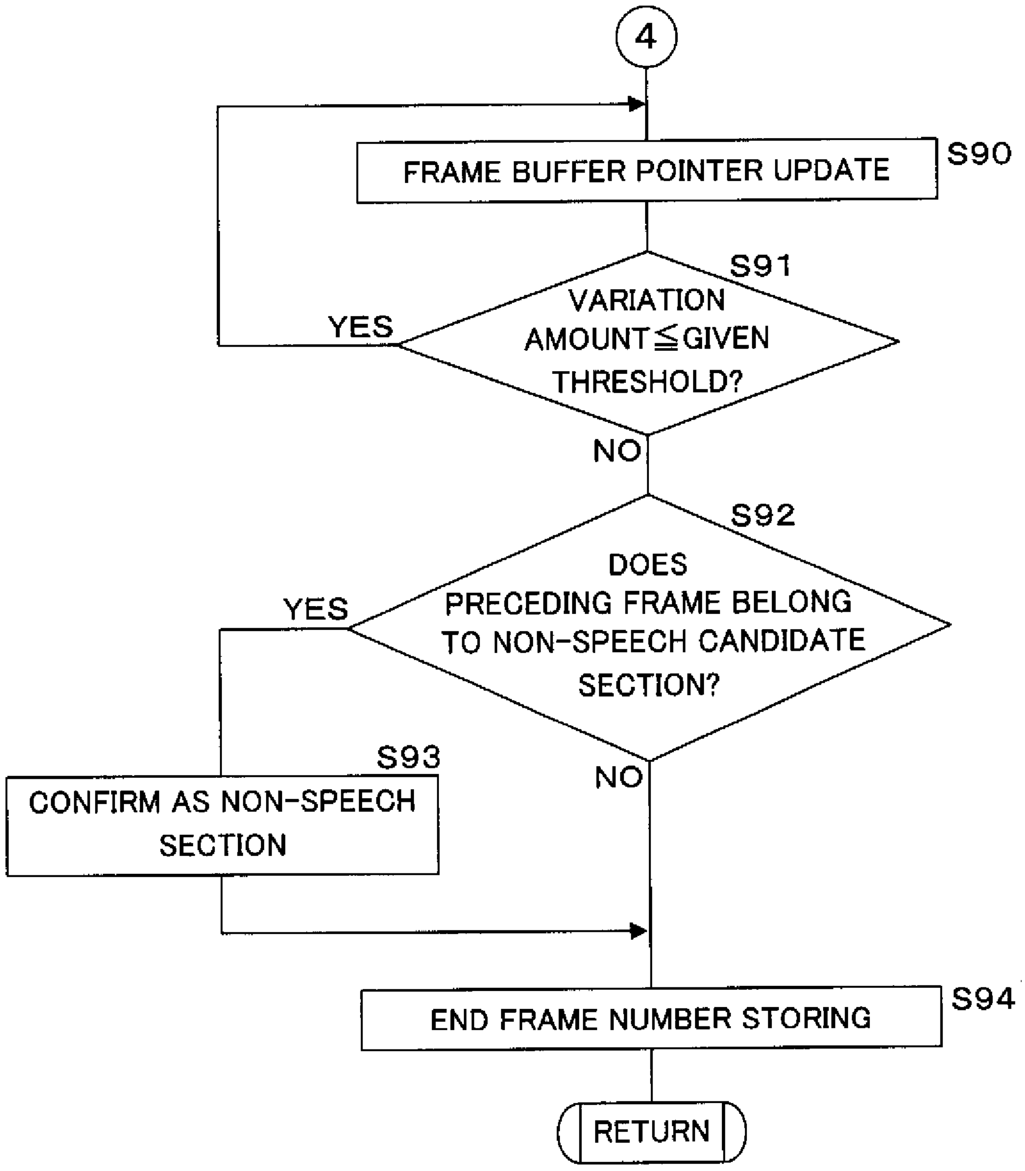

FIGS. 13A and 13B are flow charts illustrating a processing procedure performed by the control part 2 in association with the subroutine of non-speech section detection exclusion. FIGS. 14A and 14B are flow charts illustrating a processing procedure performed by the control part 2 in association with the subroutine of non-speech section detection confirmation. In FIGS. 13A and 13B, when the subroutine of non-speech section detection exclusion is called, the control part 2 stores the frame number of the frame indicated by the present pointer, as a "start frame number" in the work memory 43 (step S61). Then, the control part 2 initializes the stored value of "frame count" provided on the work memory 43 to "1" (step S62). Here, the "frame count" is used for counting the number of frames where comparison judgment between the variation amount and the second threshold has been performed.

After that, the control part 2 judges whether the memory contents value of "frame count" is smaller than or equal to a given value (e.g., 3 which is the number of frames contained within 30 msec) (step S63). When it is judged as being smaller than or equal to the given value (step S63: YES), the control part 2 adds "1" to the memory contents of "frame count" (step S64). The control part 2 updates the pointer indicating the frame buffer, backward by one frame (step S65). Then, the control part 2 judges whether the variation amount of the frame indicated by the present pointer exceeds a second threshold greater than the given threshold described above (step S66).

When the variation amount is judged as exceeding the second threshold (step S66: YES), the control part 2 returns the procedure to step S63. When the variation amount is judged as smaller than or equal to the second threshold (step S66: NO), that is, when a section where the variation amount has accidentally increased has ended, the procedure goes to step S67. The control part 2 judges whether the frame located a "second given number" of frames ago (the above-mentioned w frames ago, in this example) relative to the frame whose frame number is stored in the "start frame number" belongs to a non-speech section (step S67). When the frame located the "second given number" of frames ago is judged as belonging to a non-speech section (step S67: YES), on the assumption that the section where the variation amount has increased accidentally has a possibility of being judged later as a non-speech section, the control part 2 imparts a mark "non-speech candidate section" to the section (step S68).

When at step S63, the memory contents value of "frame count" is judged as exceeding the given value (step S63: NO), that is, when the section having a large variation amount continues to an extent of being unlike an accidental situation, the control part 2 goes to the processing of detecting the end frame of the section. The control part 2 updates the pointer indicating the frame buffer, backward by one frame (step S69). Then, the control part 2 judges whether the variation amount of the frame indicated by the present pointer exceeds the second threshold (step S70). When the variation amount is judged as exceeding the second threshold (step S70: YES), the control part 2 returns the procedure to step S69.

When the variation amount is judged as smaller than or equal to the second threshold (step S70: NO), that is, when the section where the variation amount exceeds the second threshold has ended, or alternatively, when at step S67, the frame located the "second given number" of frames ago is judged as not belonging to a non-speech section (step S67: NO), the control part 2 goes to step S71. In order to exclude from the target of non-speech section detection the section where the variation amount exceeds the second threshold, the control part 2 imparts a mark "non-speech exclusion section" to the section (step S71).

When the processing at step S71 is completed, or alternatively when the processing at step S68 is completed, the control part 2 performs the processing of subtracting "the second given number (in this example, w described above)-1" from the contents of "start frame number" (step S72). Further, the control part 2 generates a number by adding "the second given number (in this example, w described above)-1" to the frame number of the frame preceding to the frame indicated by the present pointer, then stores the generated number as the "end frame number" in the work memory 43 (step S73), and then returns the procedure.

As a result, a section obtained by extending the section where the variation amount exceeds the second threshold, by "w−1" frames forward or backward is recognized as a "non-speech candidate section" or a "non-speech exclusion section".

Figure 15A:
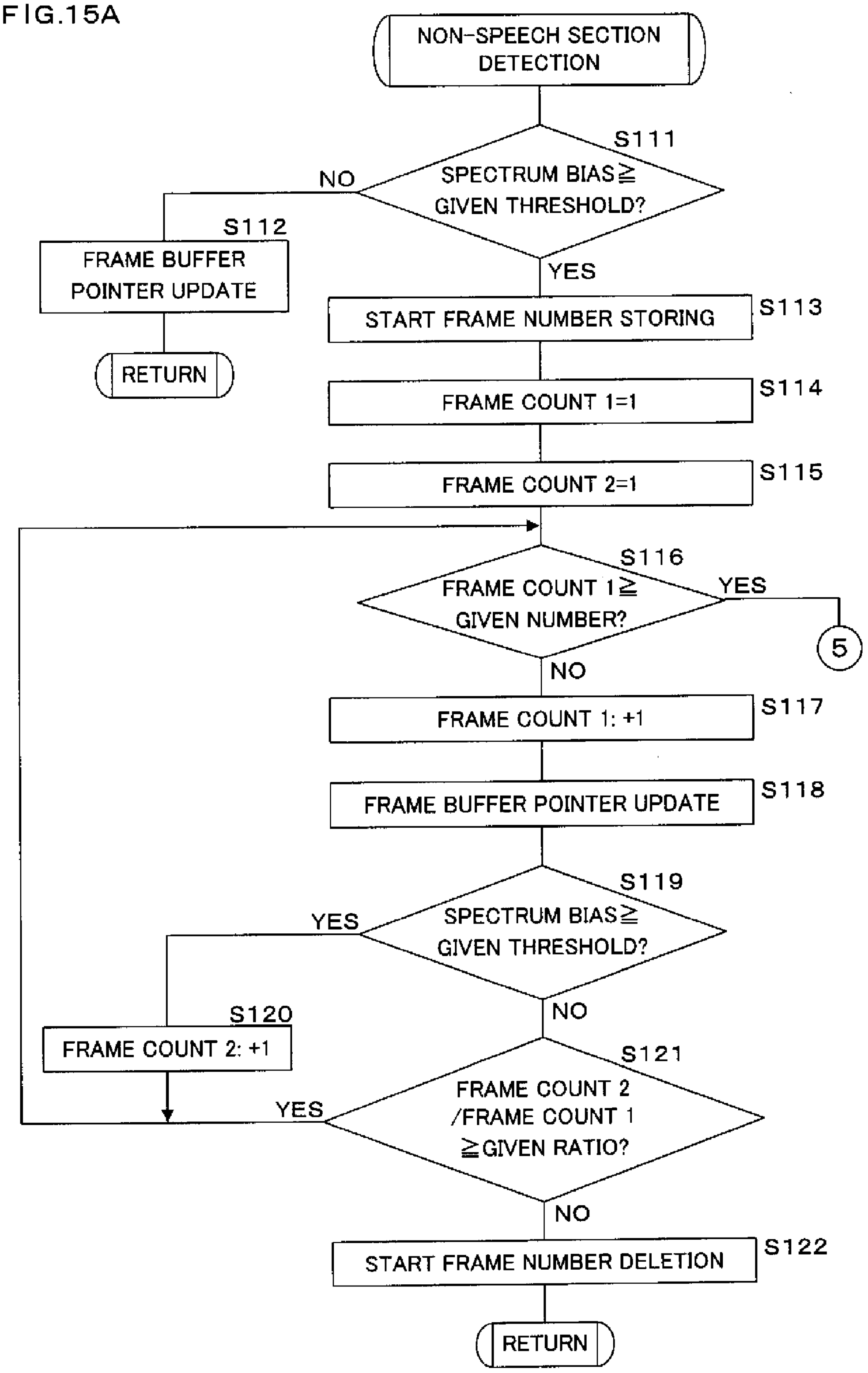
FIGS. 15A and 15B are flow charts illustrating a processing procedure performed by a control part in association with a subroutine of non-speech section detection in a speech recognition device serving as an implementation example of a non-speech section detecting device according to Embodiment 4.
Figure 15B:
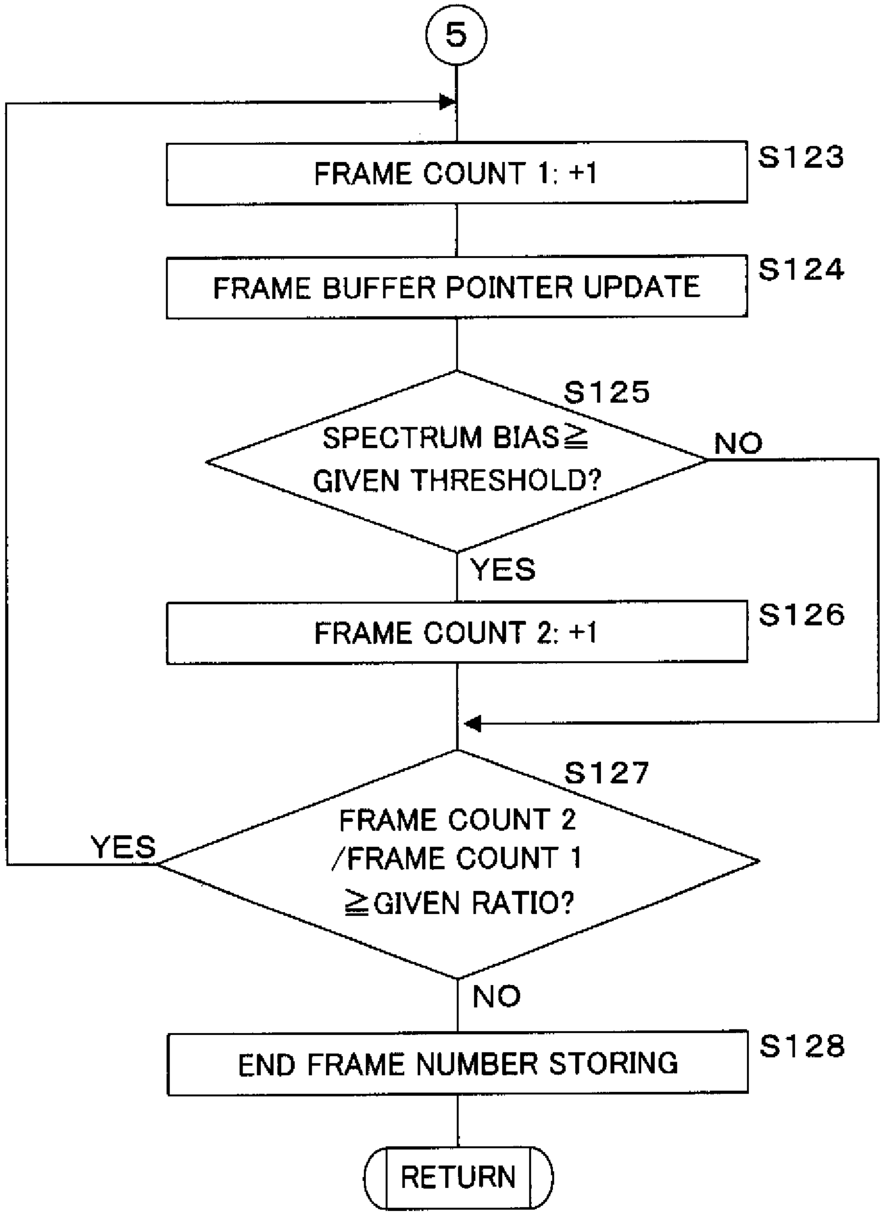

Then, in FIGS. 15A and 15B, when the subroutine of non-speech section detection confirmation is called, the control part 2 stores the frame number of the frame indicated by the present pointer, as a "start frame number" in the work memory 43 (step S81). Then, the control part 2 initializes the stored value of "frame count" provided on the work memory 43 to "1" (step S82). Here, the "frame count" is used for counting the number of frames where comparison judgment between the variation amount and a given threshold has been performed.

After that, the control part 2 judges whether the memory contents value of "frame count" is greater than or equal to a given value (e.g., the number of frames contained within the above-mentioned 0.5 seconds) which is different from the given value employed at step S63 (step S83). When it is judged as being smaller than the given value (step S83: NO), the control part 2 adds "1" to the memory contents of "frame count" (step S84). The control part 2 updates the pointer indicating the frame buffer, backward by one frame (step S85). Then, the control part 2 judges whether the variation amount of the frame indicated by the present pointer is smaller than or equal to a given threshold (step S86).

When the variation amount is judged as smaller than or equal to the given threshold (step S86: YES), the control part 2 returns the procedure to step S83. When the variation amount is judged as exceeding the given threshold (step S86: NO), that is, when the number of consecutive frames where the variation amount is smaller than or equal to the given threshold is smaller than the given value, the control part 2 recognizes that a non-speech section is not found. The control part 2 judges whether the frame preceding to the frame whose frame number is stored in the "start frame number" is contained within a non-speech candidate section (step S87).

When the preceding frame is judged as contained within a non-speech candidate section (step S87: YES), the control part 2 changes the non-speech candidate section into a non-speech exclusion section (step S88). When the preceding frame is judged as not contained within a non-speech candidate section (step S87: NO), or alternatively when the processing at step S88 is completed, the control part 2 deletes the memory contents of "start frame number" (step S89), and then returns the procedure.

When at step S83, the memory contents value of "frame count" is judged as greater than or equal to the given value (step S83: YES), the control part 2 goes to the processing of detecting the end frame of the non-speech section. The control part 2 updates the pointer indicating the frame buffer, backward by one frame (step S90). Then, the control part 2 judges whether the variation amount of the frame indicated by the present pointer is smaller than or equal to a given threshold (step S91). When the variation amount is judged as smaller than or equal to the given threshold (step S91: YES), the control part 2 returns the procedure to step S90.

When the variation amount is judged as exceeding the given threshold (step S91: NO), that is, when the detected non-speech section has ended, the control part 2 judges whether the frame preceding to the frame whose frame number is stored in the "start frame number" is contained within a non-speech candidate section (step S92). When the preceding frame is judged as contained within a non-speech candidate section (step S92: YES), the control part 2 deletes the mark of the non-speech candidate section so as to confirm the section as a non-speech section (step S93).

When the preceding frame is judged as not contained within a non-speech candidate section (step S92: NO), or alternatively when the processing at step S93 is completed, the control part 2 stores the frame number of the frame preceding to the frame indicated by the present pointer, as an "end frame number" in the work memory 43 (step S94), and then returns the procedure.

As a result, the section partitioned by the "start frame number" and the "end frame number" is recognized as a newly detected non-speech section.

In other points, like parts to those of Embodiment 1 or 2 are designated by like numerals, and hence their descriptions will not be repeated.

As such, in Embodiment 3, judgment is performed concerning at least one of the spectrum bias, the power, and the pitch calculated from the sound data of each frame. When frames where the variation amount C(t) relative to that of the preceding frame is smaller than or equal to, for example, 0.05 continue for a number of frames greater than or equal to a number corresponding to the duration time of 0.5 seconds, the section between the first frame where the variation amount becomes smaller than or equal to 0.05 and the last frame having a variation amount smaller than or equal to 0.05 is detected as a non-speech section. Further, a section having an accidentally large variation amount is excluded from the target of non-speech section detection. However, when the section is located between non-speech sections, the judgment result is nullified and the section is detected as a non-speech section.

Thus, in the present Embodiment 3, a section in which frames having a small variation amount and a feature of non-speech continue to an extent of being unlike speech is detected as a non-speech section. Accordingly, correction of the criterion value based on an utterance of a person is not necessary. Thus, even under an environment where noise having large power fluctuation is generated, a non-speech section is accurately detected regardless of the timing before or after the utterance. Further, non-speech section detection may appropriately be achieved even for a section having an accidentally large variation amount (e.g., an instance when the amount of air flow from an air conditioner has fluctuated so that a quantitative noise has varied).

Here, in Embodiment 3, employable examples of the variation amount C(t) calculated for the frame t by the variation amount calculating part 21*b* are not limited to the above-mentioned Formulas 5 and 6. In the section including forward v (e.g., v=2) frames and backward v frames relative to the frame t, that is, in the section between the frame t-v to the frame t+v, the maximum value defined by the following Formula 7 or Formula 8 may be employed.

[Mathematical expression 3]

$$D(t) = \max_{j \leq i \leq t+v} A(i) - \min_{j \leq i \leq t+v} A(i), \qquad \text{式 7}$$

$$j = \max(0, t-v) \qquad \text{Formula 7}$$

[Mathematical expression 4]

$$E(t) = \max_{j \leq i \leq t+v} C(i), \qquad \text{式 8}$$

$$j = \max(0, t-v) \qquad \text{Formula 8}$$

As a result, the variation amount is replaced by the maximum value of the variation amount in the frame near C(t). Thus, a non-speech section becomes hardly detected, and hence erroneous detection of a non-speech section is suppressed.

Further, in Embodiment 1 or Embodiment 3, the spectrum bias calculating part 21 (or the spectrum bias/power/pitch calculating part 21*a*) calculates at least one of the maximum value, the minimum value, the average, and the median of the bias of the spectrum in the section including forward z (e.g., z=2) frames and backward z frames relative to the frame t, that is, in the section between the frame t-z to the frame t+z. Then, each calculated value may be recognized as the bias of the spectrum of the frame t. By employing these statistical aggregation values, even when a rapid signal change occurs in a short time, erroneous recognition of the bias of the spectrum may be avoided. In this case, a non-speech section may be detected independently for each of the newly calculated quantities of the bias of the spectrum.

Embodiment 4

In Embodiment 1, a section in which frames where the bias of the spectrum is greater than or equal to a given threshold continue for a number greater than or equal to a given threshold has been detected as a non-speech section. In contrast, in Embodiment 4, when a section in which the fraction of frames where the bias of the spectrum is greater than or equal to a given threshold exceeds a given value continues over frames for a number greater than or equal to a given value, the section is detected as a non-speech section.

FIGS. 15A and 15B are flow charts illustrating a processing procedure performed by a control part 2 in association with a subroutine of non-speech section detection in a speech recognition device 1 serving as an implementation example of a non-speech section detecting device according to Embodiment 4.

When the subroutine of non-speech section detection is called, the control part 2 judges whether the bias of the spectrum of the frame indicated by the present pointer is greater than or equal to a given threshold (step S111). When it is judged as being smaller than the given threshold (step S111: NO), the control part 2 updates the pointer indicating the frame buffer 42 stored on the work memory 43, backward by one frame (step S112), and then returns the procedure.

As a result, the control part 2 returns the procedure without detecting a non-speech section.

When it is judged as being greater than or equal to the given threshold (step S111: YES), the control part 2 stores the frame number of the frame indicated by the present pointer, as a "start frame number" in the work memory 43 (step S113). Then, the control part 2 initializes the stored value of "frame count 1" provided on the work memory 43 to "1" (step S114). The control part 2 further initializes the stored value of "frame count 2" into "1" (step S115). Here, the "frame count 1" is used for counting the number of frames where comparison judgment between the bias of the spectrum and the given threshold has been performed. Further, the "frame count 2" is used for counting the number of frames where the bias of the spectrum is greater than or equal to the given threshold.

After that, the control part 2 judges whether the memory contents value of "frame count 1" is greater than or equal to a given value (step S116). When it is judged as being smaller than the given value (step S116: NO), the control part 2 adds "1" to the memory contents of "frame count 1" (step S117). The control part 2 updates the pointer indicating the frame buffer, backward by one frame (step S118). Then, the control part 2 judges whether the bias of the spectrum of the frame indicated by the present pointer is greater than or equal to the given threshold (step S119).

When the bias of the spectrum is judged as greater than or equal to the given threshold (step S119: YES), the control part 2 adds "1" to the memory contents of "frame count 2" (step S120), and then returns the procedure to step S116. When the bias of the spectrum is judged as smaller than the given threshold (step S119: NO), the procedure goes to step S121. The control part 2 judges whether the ratio of the memory contents value of "frame count 2" to the memory contents value of "frame count 1", that is, the ratio of the number of frames where the bias of the spectrum is greater than or equal to the given threshold relative to the number of all frames where judgment of the bias of the spectrum have been performed, is greater than or equal to a given value (e.g., 0.8) (step S121).

When it is judged as being greater than or equal to the given ratio (step S121: YES), the control part 2 returns the procedure to step S116. When it is judged as being smaller than the given ratio (step S121: NO), the control part 2 deletes the contents of "start frame number" (step S122), and then returns the procedure.

As a result, the control part 2 returns the procedure without detecting a non-speech section.

When at step S116, the memory contents value of "frame count 1" is judged as greater than or equal to the given value (step S116: YES), the control part 2 goes to the processing of detecting the end frame of the non-speech section, and then adds "1" to the memory contents of "frame count" (step S123). The control part 2 updates the pointer indicating the frame buffer, backward by one frame (step S124). Then, the control part 2 judges whether the bias of the spectrum of the frame indicated by the present pointer is greater than or equal to the given threshold (step S125).

When the bias of the spectrum is judged as greater than or equal to the given threshold (step S125: YES), the control part 2 adds "1" to the memory contents of "frame count 2" (step S126). When the processing at step S126 is completed, or alternatively when the bias of the spectrum is judged as smaller than the given threshold (step S125: NO), the control part 2 goes to step S127. The control part 2 judges whether the ratio of the memory contents value of "frame count 2" to the memory contents value of "frame count 1" is greater than or equal to the given ratio (step S127).

When it is judged as being greater than or equal to the given ratio (step S127: YES), the control part 2 returns the procedure to step S123. Further, when it is judged as being smaller than the given ratio (step S127: NO), the control part 2 stores the frame number of the frame preceding to the frame indicated by the present pointer, as the "end frame number," in the work memory 43 (step S128), and then returns the procedure.

As a result, the section partitioned by the "start frame number" and the "end frame number" is recognized as a detected non-speech section.

In other points, like parts to those of Embodiment 1 are designated by like numerals, and hence their descriptions will not be repeated.

In Embodiment 4, in a section in which the fraction of frames where the bias of the spectrum calculated from the sound data of each frame is greater than or equal to a given threshold exceeds a given value, when the section continues over frames in a number greater than or equal to a given value, the section between the first frame where the bias of the spectrum becomes greater than or equal to the given threshold and the position immediately before the fraction of frames where the bias of the spectrum is greater than or equal to the given threshold becomes smaller than the given value is detected as a non-speech section.

Thus, even when the bias of the spectrum fluctuates in a short time, a non-speech section may accurately be detected.

Here, the to-be-detected head frame of a non-speech section is not limited to the first frame where the value becomes greater than or equal to the given threshold. As long as being within a range in which the fraction of frames where the bias of the spectrum is greater than or equal to a given threshold is greater than or equal to a given value, a frame located forward relative to the above-mentioned first frame may be adopted as the head frame.

Embodiment 5

Embodiment 5 is a mode that in Embodiment 1, a signal-to-noise ratio is calculated and then in accordance with the calculated signal-to-noise ratio, the given threshold concerning the bias of the spectrum is changed.

Figure 16:
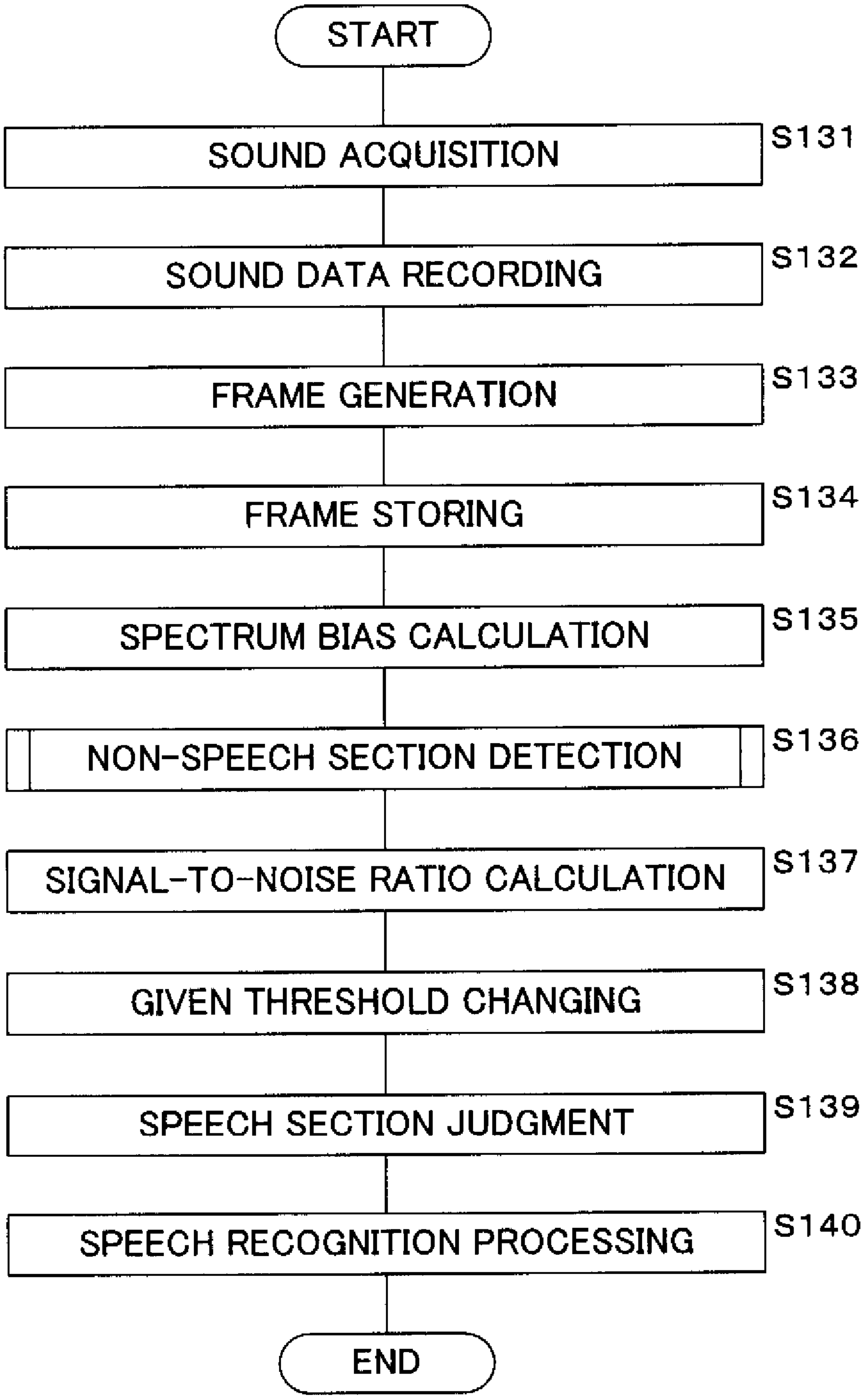
FIG. 16 is a flow chart illustrating an example of speech recognition processing performed by a control part of a speech recognition device serving as an implementation example of a non-speech section detecting device according to Embodiment 5.

FIG. 16 is a flow chart illustrating an example of speech recognition processing performed by a control part 2 of a the speech recognition device 1 serving as an implementation example of a non-speech section detecting device according to Embodiment 5.

The processing at steps S131 to S135 is similar to that at steps S11 to S15 in FIG. 3. Thus, description is not repeated. The following processing is performed on the bias of the spectrum generated in the processing at steps S131 to S135 and then written into the frame buffer 42.

For the frame provided from the spectrum bias calculating part 21 via the frame buffer 42, the non-speech section detecting part 22 calls the subroutine of detecting a non-speech section (step S136). After that, on the basis of the sound data of the frames detected as a non-speech section and the sound data of the frames other than the non-speech section, the control part 2 calculates the signal-to-noise ratio (step S137). Then, in accordance with the high/low of the calculated signal-to-noise ratio, the control part 2 decreases/increases the given threshold (step S138).

The speech section judging part 23 recognizes as a speech section the section not detected as a non-speech section by the non-speech section detecting part 22. The speech section judging part 23 confirms the speech section start frame and the speech section end frame, and then terminates the judgment of one speech section (step S139). The speech section detected as described here is provided to the speech recognition part 24 via the frame buffer.

By using a general technique in the field of speech recognition, the speech recognition part 24 executes speech recognition processing up to the end of the input data in the frame buffer 42 (step S140).

In other points, like parts to those of Embodiment 1 are designated by like numerals, and hence their descriptions will not be repeated.

In Embodiment 5, on the basis of the sound data of the frames detected as a non-speech section and the sound data of the frames other than the non-speech section, the signal-to-noise ratio is calculated. In Embodiment 5, in accordance with the high/low of the calculated signal-to-noise ratio, the given threshold concerning the bias of the spectrum is decreased/increased.

As a result, even when the signal-to-noise ratio goes lower, a situation is avoided that the noise causes the bias of the spectrum to fluctuate and thereby causes erroneous detection of a non-speech section.

Embodiment 6

Embodiment 6 is a mode that in Embodiment 1, the maximum of the intensity values of frequency components of the pitch is calculated (referred to as the pitch intensity, hereinafter) and then in accordance with the calculated pitch intensity, a given threshold concerning the bias of the spectrum is changed.

Figure 17A:
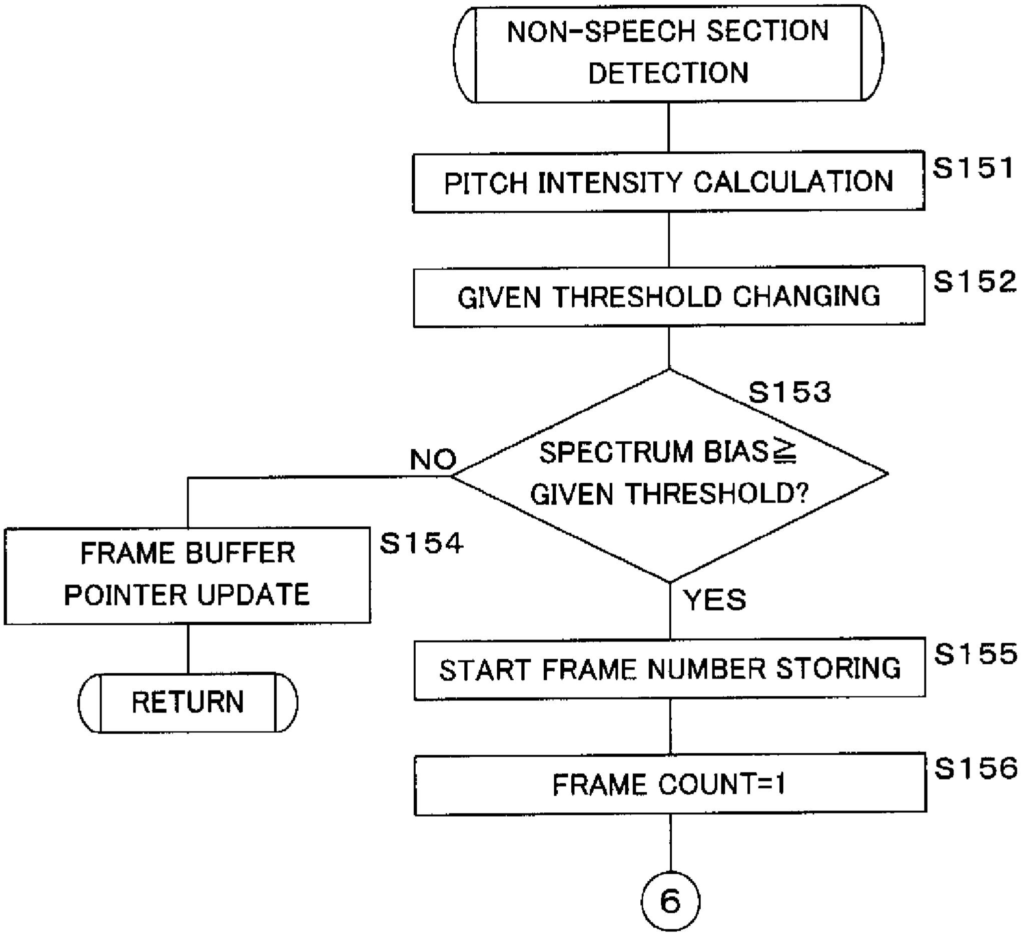
FIGS. 17A and 17B are flow charts illustrating a processing procedure performed by a control part in association with a subroutine of non-speech section detection in a speech recognition device serving as an implementation example of a non-speech section detecting device according to Embodiment 6.
Figure 17B:
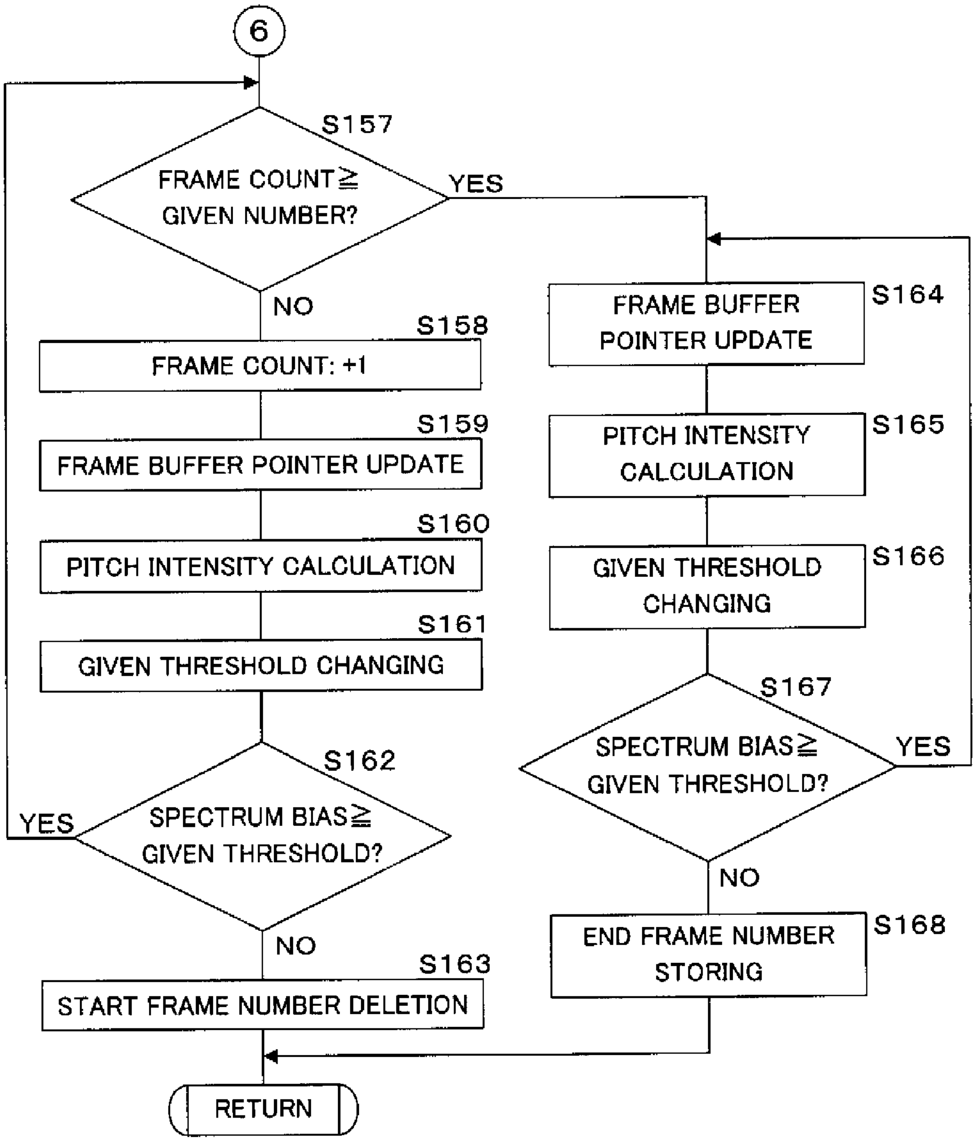

FIGS. 17A and 17B are flow charts illustrating a processing procedure performed by a control part 2 in association with a subroutine of non-speech section detection in a the speech recognition device 1 serving as an implementation example of a non-speech section detecting device according to Embodiment 6.

When the subroutine of non-speech section detection is called, the control part 2 calculates the pitch intensity of the frame indicated by the present pointer (step S151). In accordance with the high/low of the calculated pitch intensity, the control part 2 decreases/increases the given threshold (step S152). After that, the control part 2 judges whether the bias of the spectrum of the frame is greater than or equal to the given threshold (step S153). When it is judged as being smaller than the given threshold (step S153: NO), the control part 2 updates the pointer indicating the frame buffer 42 stored on the work memory 43, backward by one frame (step S154), and then returns the procedure.

As a result, the control part 2 returns the procedure without detecting a non-speech section.

When it is judged as being greater than or equal to the given threshold (step S153: YES), the control part 2 stores the frame number of the frame indicated by the present pointer, as a "start frame number" onto the work memory 43 (step S155). Then, the control part 2 initializes the stored value of "frame count" provided on the work memory 43 into "1" (step S156). Here, the "frame count" is used for counting the number of frames where comparison judgment between the bias of the spectrum and the given threshold has been performed.

After that, the control part 2 judges whether the memory contents value of "frame count" is greater than or equal to a given value (step S157). When it is judged as being smaller than the given value (step S157: NO), the control part 2 adds "1" to the memory contents of "frame count" (step S158). The control part 2 updates the pointer indicating the frame buffer 42, backward by one frame (step S159). After that, the control part 2 calculates the pitch intensity of the frame indicated by the present pointer (step S160), and then on the basis of the calculated pitch intensity, changes the given threshold (step S161).

Then, the control part 2 judges whether the bias of the spectrum is greater than or equal to a given threshold (step S162). When it is judged as being greater than or equal to the given threshold (step S162: YES), the control part 2 returns the procedure to step S157. When it is judged as being smaller than the given threshold (step S162: NO), the control part 2 deletes the contents of "start frame number" (step S163), and then returns the procedure.

As a result, the control part 2 returns the procedure without detecting a non-speech section.

When at step S157, the memory contents value of "frame count" is judged as greater than or equal to the given value (step S157: YES), the control part 2 goes to the processing of detecting the end frame of the non-speech section, and then updates the pointer indicating the frame buffer, backward by one frame (step S164). After that, the control part 2 calculates the pitch intensity of the frame indicated by the present pointer (step S165). On the basis of the calculated pitch intensity, the control part 2 changes the given threshold (step S166).

Then, the control part 2 judges whether the bias of the spectrum of the frame is greater than or equal to the given threshold (step S167). When it is judged as being greater than or equal to the given threshold (step S167: YES), the control part 2 returns the procedure to step S164. Further, when it is judged as being smaller than the given threshold (step S167: NO), the control part 2 stores the frame number of the frame preceding to the frame indicated by the present pointer, as the "end frame number" in the work memory 43 (step S168), and then returns the procedure.

As a result, the section partitioned by the "start frame number" and the "end frame number" is recognized as a detected non-speech section.

Here, the pitch intensity mentioned at step S151, S160 and S165 with reference to FIGS. 17A and 17B is described below in further detail.

The pitch intensity B is calculated from the autocorrelation function $\gamma(\tau)$ of the short-time spectrum $S(\omega)$ in accordance with the following Formula 9.

$$B = \operatorname{argmax}\ \gamma(\tau) \text{ for } 1 \leq \tau \leq \tau\text{max}, \quad \text{Formula 9}$$

Here, $\tau$max is a value corresponding to the expected maximum pitch frequency.

For example, in a case of 8000-Hz sampling with a frame length of 256 samples, the short-time spectrum of 0 to 4000 Hz is expressed by a 129-dimensional vector. In this case, when the maximum pitch frequency is 500 Hz, on the short-time spectrum, $\tau_{max}=16$ is obtained because $500/4000 \times 128 = 16$.

In other points, like parts to those of Embodiment 1 are designated by like numerals, and hence their descriptions will not be repeated.

As such, in Embodiment 6, the pitch intensity is calculated for the sound data of each frame, and then in accordance with the high/low of the calculated pitch intensity, the given threshold concerning the bias of the spectrum is decreased/increased. For example, when the pitch intensity is high, that is, when the pitch is clear, the sound data is expected to be a vowel or a half vowel of speech. In this case, the value taken by the bias of the spectrum has limitation. Thus, even when the given threshold is decreased so that the judgment condition used in detecting a non-speech section is loosen, erroneous detection is suppressed and a non-speech section may accurately be detected.

Here, in place of changing the given threshold in accordance with the calculated pitch intensity, for example, the following judgment (h) may be added.

(h) In a case that pitch intensity B given intensity holds and that $|A| \geq 0.5$ continues for 0.5 seconds or longer, the section is recognized as a non-speech (this is an improvement based on a combination of the above-mentioned judgment (b) or (c) and the pitch intensity).

Embodiment 7

Embodiment 7 is a mode that in Embodiment 1, the given threshold concerning the bias of the spectrum is determined on the basis of learning performed in advance.

Figure 18:
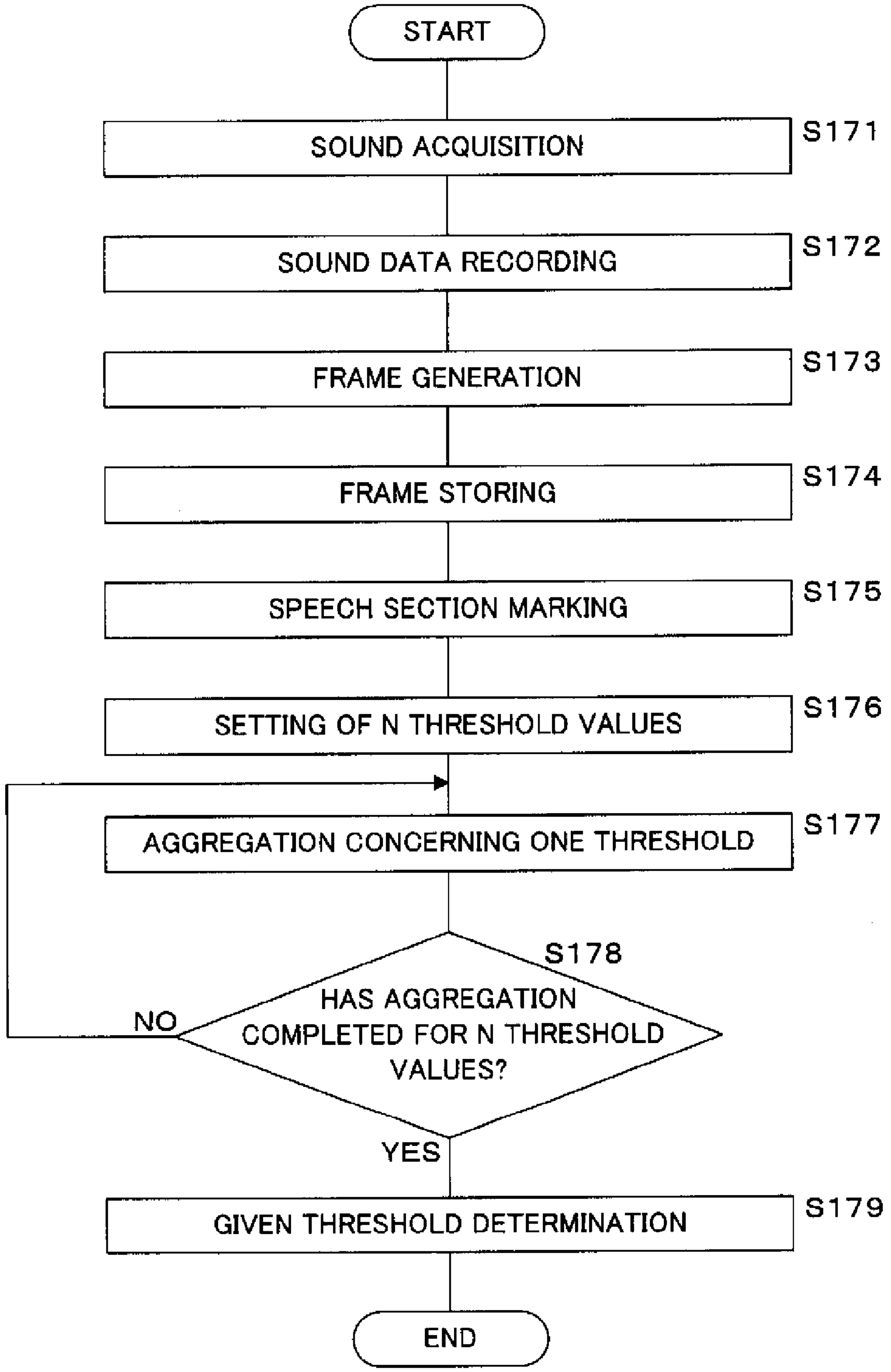
FIG. 18 is a flow chart illustrating an example of speech recognition processing performed by a control part of a speech recognition device serving as an implementation example of a non-speech section detecting device according to Embodiment 7.

FIG. 18 is a flow chart illustrating an example of speech recognition processing performed by a control part 2 of a the speech recognition device 1 serving as an implementation example of a non-speech section detecting device according to Embodiment 7.

The processing at steps S171 to S174 is similar to that at steps S11 to S14 in FIG. 3. Thus, description is not repeated. The following processing is performed on each frame generated in the processing at steps S171 to S174.

For the frames provided via the frame buffer 42, the control part 2 marks an utterance section in the sound data (step S175). At that time, the marking of an utterance section is achieved easily, because phoneme labeling has been performed in the voice data for learning. Further, the control part 2 sets up N threshold values within the range [−1,−1] of the value |A| taken by the bias of the spectrum (step S176). Then, for one of the N threshold values, the control part 2 aggregates the maximum number of consecutive frames having a value greater than or equal to the threshold (step S177).

Then, the control part 2 judges whether the aggregation has been completed for all N threshold values (step S178). When the aggregation is judged as not completed (step S178: NO), the control part 2 returns the procedure to step S177. When the aggregation is judged as completed for all N threshold values (step S178: YES), the control part 2 determines the given threshold concerning the bias of the spectrum on the basis of the result of aggregation (step S179).

In this case, it is preferable that the given threshold is determined as somewhat larger (or smaller) so that erroneous detection of a non-speech section is suppressed.

As such, in Embodiment 7, for an utterance section where marking has been performed in existing voice data, a plurality of threshold candidates are prepared in advance. In Embodiment 7, on the basis of the result of aggregation of the maximum number of consecutive frames having a value greater than or equal to a given threshold, an optimum value for the given threshold concerning the bias of the spectrum is determined from among a plurality of threshold candidates.

Thus, a non-speech section may accurately be detected.

Embodiments 1 to 7 have been described for a case that the absolute value |A| of the high-frequency/low-frequency intensity is adopted as the bias of the spectrum and then it is judged whether the bias of the spectrum is greater than or equal to a given positive threshold. Instead, in each embodiment, the high-frequency/low-frequency intensity A may be adopted as the bias of the spectrum. Then, when the bias of the spectrum is positive (or negative), it may be judged whether the bias is greater than or equal to a given positive threshold (or smaller than or equal to a given negative threshold).

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-speech section detecting device generating a plurality of frames having a given time length on the basis of sound data obtained by sampling sound, and detecting a non-speech section having a frame not including voice data based on speech uttered by a person, the device comprising:

a first calculating part configured to calculate, for each frame of the plurality of frames, a value, wherein the value is one of a power of sound data, a pitch of sound data, or a bias of a spectrum obtained by converting sound data into components on a frequency axis;

a second calculating part configured to calculate, for a pair of consecutive frames, a variation between the calculated values calculated for the frames in the pair and configured to judge whether the calculated variation is smaller than or equal to a given threshold, and performing, for each pair of consecutive frames in the plurality of frames, the calculating of a variation and the judging;

a counting part configured to count a number of variations judged as smaller than or equal to the threshold;

a count judging part configured to judge whether the counted number is greater than or equal to a given value; and a detecting part configured to detect, when the counted number is judged as greater than or equal to the given value, a section of the sound data as a non-speech section.

2. The non-speech section detecting device according to claim 1, further comprising a second judging part configured to judge whether any of the variations calculated by the second calculating part exceeds a second threshold greater than said given threshold, wherein when the second judging part judges any of the variations as exceeding the second threshold, the detecting part excludes a sound data section including the frames corresponding to a variation which exceeds the second threshold, from being detected as a non-speech section.

3. The non-speech section detecting device according to claim 2, further comprising:

a satisfaction counting part configured to count the number of variations which exceed the second threshold;

a given number judging part configured to judge whether the number of variations counted in the satisfaction counting part is smaller than or equal to a third threshold; and a second detecting part configured to detect, in a case that the number of variations counted in the satisfaction counting part is judged to be less than the third threshold, a section of the sound data is designated as a non-speech section.

4. The non-speech section detecting device according to claim 2, further comprising a third calculating part configured to calculate a maximum value of at least two of the calculated variations, wherein the judging part treats the maximum value calculated by the third calculating part, as a variation of the frames corresponding to the at least two calculated variations.

5. A non-speech section detecting method of generating a plurality of frames having a given time length on the basis of sound data obtained by sampling sound, and detecting a non-speech section having a frame not including voice data based on speech uttered by a person, the method comprising:

calculating, for each frame of the plurality of frames, a value, wherein the value is one of a power of sound data, or a pitch of sound data, or a bias of a spectrum obtained by converting sound data into components on a frequency axis, using a processor;

calculating, for a pair of consecutive frames, a variation between the calculated values calculated for the frames in the pair and judging whether the calculated variation is smaller than or equal to a given threshold, and performing, for each pair of consecutive frames in the plurality of frames, the calculating of a variation and the judging using the processor;

counting a number of variations judged as smaller than or equal to the threshold using the processor;

judging whether the counted number of variations is greater than or equal to a given value using the processor; and detecting, when the counted number of variations is judged as greater than or equal to the given value, a section of the sound data as a non-speech section using the processor.

* * * * *